US012754100B2

(12) United States Patent
Takenaga et al.

(10) Patent No.: US 12,754,100 B2
(45) Date of Patent: Oct. 6, 2026

(54) CROSSTALK MEASURING METHOD, AND CROSSTALK MEASURING DEVICE

(71) Applicant: Fujikura Ltd., Tokyo (JP)

(72) Inventors: Katsuhiro Takenaga, Sakura (JP); Mayu Nakagawa, Sakura (JP); Masaki Ohzeki, Sakura (JP)

(73) Assignee: Fujikura Ltd., Tokyo (JP)

( * ) Notice: Subject to any disclaimer, the term of this patent is extended or adjusted under 35 U.S.C. 154(b) by 154 days.

(21) Appl. No.: 18/863,782

(22) PCT Filed: Apr. 28, 2023

(86) PCT No.: PCT/JP2023/016935
§ 371 (c)(1),
(2) Date: Nov. 7, 2024

(87) PCT Pub. No.: WO2023/219019
PCT Pub. Date: Nov. 16, 2023

(65) Prior Publication Data

US 2026/0194418 A1 Jul. 9, 2026

(30) Foreign Application Priority Data

May 10, 2022 (JP) ................................ 2022-077811
Aug. 31, 2022 (JP) ................................ 2022-138609

(51) Int. Cl.

*G01M 11/00* (2006.01)
*G02B 6/02* (2006.01)
*H04B 10/071* (2013.01)

(52) U.S. Cl.

CPC .... *G01M 11/3145* (2013.01); *G01M 11/3109* (2013.01); *G02B 6/02042* (2013.01); *H04B 10/071* (2013.01)

(58) Field of Classification Search

CPC .......... G01M 11/3109; G01M 11/3145; G02B 6/02042; H04B 10/071
See application file for complete search history.

(56) References Cited

U.S. PATENT DOCUMENTS

2011/0310378 A1* 12/2011 Froggatt ............. G01D 5/3538 356/477
2016/0018245 A1 1/2016 Yamate et al.
2018/0246007 A1* 8/2018 Saito ................. G01M 11/0207

FOREIGN PATENT DOCUMENTS

CN 113804300 A * 12/2021 ................ G01J 4/00
CN 113804302 A * 12/2021 ................ G01J 4/00
(Continued)

OTHER PUBLICATIONS

Ohashi, M. et al. "OTDR technique for measuring crosstalk and fiber parameters in multi-core fibers". 2016 IEEE 6th International Conference on Photonics (ICP), 2016. (Year: 2016).*
(Continued)

*Primary Examiner* — Michael A Lyons
(74) *Attorney, Agent, or Firm* — Osha Bergman Watanabe & Burton LLP

(57) ABSTRACT

A crosstalk measuring method for an optical device includes optically connecting one end of a first optical waveguide to one end of a second optical waveguide via a first connection optical waveguide, inputting pulsed incident light emitted from an OTDR into the other end of the first optical waveguide, outputting, from the other end of the first optical waveguide, first output light including pulsed light in which first crosstalk light is multiplexed with second crosstalk light, measuring power of the first output light, and calculating a magnitude of crosstalk between the first optical waveguide and the second optical waveguide based on the measured power of the first output light.

13 Claims, 8 Drawing Sheets

(56) References Cited

FOREIGN PATENT DOCUMENTS

| | | | |
|---|---|---|---|
| CN | 114236675 | A | 3/2022 |
| JP | H04104032 | A | 4/1992 |
| JP | 2012202827 | A | 10/2012 |
| JP | 2013238592 | A | 11/2013 |
| JP | 2014025921 | A | 2/2014 |
| JP | 2014153116 | A | 8/2014 |
| JP | 2014206517 | A | 10/2014 |
| JP | 2016057297 | A | 4/2016 |
| JP | 2016225899 | A | 12/2016 |
| JP | 2016225900 | A | 12/2016 |
| JP | 2018169236 | A | 11/2018 |

OTHER PUBLICATIONS

Nakagawa, Mayu, et al.; "Novel inter-core crosstalk measurement method using loopback OTDR technique"; IEICE Technical Report; Feb. 9, 2023; with English abstract (5 pages).

Nakazawa, Masataka, et al.; "Nondestructive measurement of mode couplings along a multi-core fiber using a synchronous multi-channel OTDR"; Optics Express, vol. 20, Issue 11, pp. 12530-12540; 2012 (11 pages).

Ohashi, M., et al.; "Simple Backscattered Power Technique for Measuring Crosstalk of Multi-Core Fibers"; OptoElectronics and Communications Conference; Busan, South Korea; Jul. 2012 (2 pages).

Takenaga, Katsuhiro, et al.; "An Investigation on Crosstalk in Multi-Core Fibers by Introducing Random Fluctuation along Longitudinal Direction"; IEICE Trans. Commun., vol. E94-B, No. 2; Feb. 2011 (8 pages).

International Search Report issued in corresponding International Application No. PCT/JP2023/016935, mailed Jul. 18, 2023 (4 pages).

* cited by examiner

CROSSTALK MEASURING METHOD, AND CROSSTALK MEASURING DEVICE

BACKGROUND

Technical Field

The present invention relates to a crosstalk measuring method and a crosstalk measuring device.

Discussion of the Background

In response to an increase in the amount of information communication in recent years, an increase in transmission capacity of an optical fiber is demanded. A multicore fiber is attracting attention because it can increase space utilization efficiency and can transmit a large amount of information in a limited space. However, a plurality of cores is arranged in one optical fiber, and thus it is difficult to evaluate characteristics as compared with a single-core fiber. Therefore, a technique for efficiently evaluating a multicore fiber is demanded. In particular, measurement of crosstalk is an important measurement item in a multicore fiber and is not included in a measurement item of a single-core fiber, and thus it is necessary to newly prepare a measurement device or the like.

As a crosstalk measuring method, a method described in the following Non Patent Literature is known. Non Patent Literature 1 below discloses a Power Meter (PM) method. The PM method is a method in which light is caused to enter a predetermined core of a multicore fiber from one end of the core, and power of light emitted from the other end of the core in which crosstalk with the core occurs is measured. Non Patent Literatures 2 and 3 below describe an optical time domain reflectometer (OTDR) method. In the OTDR method, light is caused to enter a predetermined core using a multi-channel OTDR, and light in which backscattered light of the light that has crosstalk with another core is detected to measure the crosstalk.

Non Patent Literature 1: K. Takenaga, Y. Arakawa, S. Tanigawa, N. Guan, S. Matsuo, K. Saitoh and M. Koshiba, "An Investigation on Crosstalk in Multi-Core Fibers by Introducing Random Fluctuation along Longitudinal Direction", IEICE TRAN. COMMUN., Vol.E94-B, No. 2, 2011.

Non Patent Literature 2: M. Ohashi, K. Kawazu, A. Nakamura, and Y. Miyoshi, "Simple backscattered power technique for measuring crosstalk of multi-core fibers", Opto-Electronics and Communications Conference, Busan, South Korea, P1-25, 2012, DOI: https://doi.org/10.1109/OECC.2012.6276724

Non Patent Literature 3: M. Nakazawa, M. Yoshida, and T. Hirooka, "Nondestructive measurement of mode couplings along a multi-core fiber using a synchronous multi-channel OTDR", Optics Express, vol. 20, Issue 11, pp. 12530-12540, 2012

In the PM method, it is necessary to cause light to enter from one end of a multicore fiber and receive light emitted from the other end. On the other hand, in the OTDR method, light is caused to enter from one end of a multicore fiber, and light emitted from the one end is received. Therefore, there is a need to measure the crosstalk using the OTDR method. However, in the crosstalk measuring methods described in Non Patent Literatures 2 and 3, since backscattered light of light after crosstalk is measured, power of the measured light is small, and there is a concern that it is difficult to measure crosstalk. In a multicore fiber having small crosstalk, it is further difficult to measure crosstalk. However, as described above, there is a need to measure the crosstalk using the OTDR method. Such a need may occur not only for multicore fibers but also for optical devices having a plurality of optical waveguides in which crosstalk may occur.

SUMMARY

One or more embodiments provide a crosstalk measuring method and a crosstalk measuring device capable of easily measuring crosstalk using an OTDR method.

A first aspect of one or more embodiments is a crosstalk measuring method for an optical device including a first optical waveguide and a second optical waveguide that include one end and another end and are parallel to each other, the crosstalk measuring method including a connecting step of optically connecting the another end of the first optical waveguide and the another end of the second optical waveguide via a first connection optical waveguide, a first measuring step of causing pulsed incident light emitted from an optical time domain reflectometer (OTDR) to enter from the one end of the first optical waveguide, and measuring power of emitted light (example of first output light) emitted from the one end of the first optical waveguide by the OTDR, the emitted light including pulsed light in which light (example of first crosstalk light) generated by crosstalk of the incident light from the first optical waveguide to the second optical waveguide and light (example of second crosstalk light) generated by crosstalk of the incident light incident from the first optical waveguide to the second optical waveguide via the first connection optical waveguide, the crosstalk being from the second optical waveguide to the first optical waveguide, are multiplexed, and a processing step obtaining (calculating) magnitude of crosstalk between the first optical waveguide and the second optical waveguide by using the measured power of the emitted light.

Pulsed incident light propagating from one end to the another end of the first optical waveguide propagates from the first optical waveguide to the second optical waveguide while causing crosstalk. Therefore, crosstalk light causing crosstalk from the first optical waveguide to the second optical waveguide is also pulsed, and propagates from one end side to the another end of the second optical waveguide while traveling substantially in parallel with the incident light. The incident light reaching the another end of the first optical waveguide enters the first connection optical waveguide. Further, the pulsed crosstalk light propagating from one end side of the second optical waveguide and reaching the another end of the second optical waveguide enters the first connection optical waveguide from an opposite side of the incident light. Because the speed of light in an optical device is constant, a propagation speed of incident light and a propagation speed of crosstalk light are equal to each other. Therefore, the incident light and the crosstalk light reach the another ends of the first optical waveguide and the second optical waveguide substantially simultaneously, and the incident light and the crosstalk light pass by each other at substantially a middle point of the first connection optical waveguide. Then, the incident light enters the second optical waveguide from the another end of the second optical waveguide, and the crosstalk light enters the first optical waveguide from the another end of the first optical waveguide. At this time, the timing at which the incident light enters the second optical waveguide and the timing at which the crosstalk light enters the first optical waveguide are substantially the same timing. Thus, the crosstalk light propagates through the first optical waveguide from the another end to the one end while traveling substantially in parallel with the incident light propagating through the second optical waveguide from the another end to the one end. During this time, the incident light propagating through the second optical waveguide propagates through the first optical waveguide while causing crosstalk. Therefore, the light causing crosstalk from the second optical waveguide to the first optical waveguide is multiplexed with the crosstalk light propagating through the first waveguide. The multiplexed light is pulsed light, and the emitted light emitted from the one end of the first optical waveguide includes pulse light generated by crosstalk. The light emitted from the first optical waveguide is received by the OTDR, and power of the emitted light is measured. The magnitude of the crosstalk between the first optical waveguide and the second optical waveguide is obtained using the measured power of the emitted light.

As described above, according to the crosstalk measuring method of one or more embodiments, because light in which the light incident on the optical waveguide using the OTDR causes crosstalk to another optical waveguide is used, the power of crosstalk light is large as compared with the case of detecting backscattered light of the crosstalk light as in Patent Literatures 2 and 3. Furthermore, in the crosstalk measuring method of the present aspect, the crosstalk light when the incident light propagates from one end to the another end of the first optical waveguide and the crosstalk light when the incident light propagates from the another end to the one end of the second optical waveguide are multiplexed, so that the power of pulsed light generated by the crosstalk tends to be large. Therefore, according to the crosstalk measuring method of the present aspect, crosstalk can be easily measured.

A second aspect of one or more embodiments is the crosstalk measuring method according to the first aspect, in which a length of the first connection optical waveguide is longer than a half width of the incident light.

As described above, the incident light and the crosstalk light pass each other at substantially a midpoint of the first connection optical waveguide. Therefore, in the OTDR, it seems that the pulsed light generated by the crosstalk is generated at substantially the midpoint of the first connection optical waveguide. In addition, a pulse width of the incident light and a pulse width of the crosstalk light are substantially the same. Therefore, according to the crosstalk measuring method of the present aspect, noise such as reflection at an end of the first connection optical waveguide can be suppressed from affecting emitted light including pulsed crosstalk light, and the crosstalk can be measured more accurately.

A third aspect of one or more embodiments is the crosstalk measuring method according to the first or second aspect, further including a second measuring step of causing pulsed incident light emitted from the OTDR to enter from the one end of the second optical waveguide and measuring power of emitted light (example of second output light) emitted from the one end of the second optical waveguide by the OTDR, the emitted light including pulsed light in which light (example of third crosstalk light) generated by crosstalk of the incident light from the second optical waveguide to the first optical waveguide and light (example of fourth crosstalk light) generated by crosstalk of the incident light incident from the second optical waveguide to the first optical waveguide via the first connection optical waveguide, the crosstalk being from the first optical waveguide to the second optical waveguide, are multiplexed, in which in the processing step, the magnitude of the crosstalk between the first optical waveguide and the second optical waveguide is obtained using the power of the emitted light measured in the first measuring step and the power of the emitted light measured in the second measuring step.

In this case, the crosstalk light generated by propagating the incident light from the first optical waveguide to the second optical waveguide and the crosstalk light generated by propagating the incident light from the second optical waveguide to the first optical waveguide are used, so that errors can be suppressed and the crosstalk can be obtained more accurately as compared with a case of using only the crosstalk light generated by propagating the incident light from the first optical waveguide to the second optical waveguide.

A fourth aspect of one or more embodiments is the crosstalk measuring method according to the third aspect, in which in the processing step, the magnitude of the crosstalk between the first optical waveguide and the second optical waveguide is obtained using a result of averaging the power of the emitted light measured in the first measuring step and the power of the emitted light measured in the second measuring step.

By using such an averaging process, the magnitude of crosstalk can be easily and accurately obtained.

A fifth aspect of one or more embodiments is the crosstalk measuring method according to any one of the first to fourth aspects, in which a wavelength width of the incident light is equal to or more than 1 nm.

In this case, an error in the power of the emitted light measured by the OTDR can be reduced.

A sixth aspect of one or more embodiments is the crosstalk measuring method according to any one of the first to fifth aspects, in which the OTDR and the first optical waveguide, the first optical waveguide and the first connection optical waveguide, and the first connection optical waveguide and the second optical waveguide are optically connected by a fan-in-fan-out device, and in the processing step, magnitude of crosstalk in the fan-in-fan-out device is removed, and the magnitude of the crosstalk between the first optical waveguide and the second optical waveguide is obtained.

In this case, it is possible to suppress the influence of the crosstalk in the device in a case where the fan-in-fan-out device is used, and to more accurately obtain the crosstalk.

A seventh aspect of one or more embodiments is the crosstalk measuring method according to any one of the first to sixth aspects, in which the optical device further includes a third optical waveguide arranged in parallel with the first optical waveguide, and in the processing step, magnitude of crosstalk between the first optical waveguide and the third optical waveguide is further obtained on the basis of the obtained magnitude of the crosstalk between the first optical waveguide and the second optical waveguide.

In this case, the magnitude of the crosstalk between the first optical waveguide and the third optical waveguide can be easily obtained without measuring the power of the light due to the crosstalk between the first optical waveguide and the third optical waveguide. In this case, for example, the magnitude of the crosstalk between the first optical waveguide and the third optical waveguide is obtained using a relational expression indicating a relationship between the magnitude of the crosstalk between the first optical waveguide and the second optical waveguide and the magnitude of the crosstalk between the first optical waveguide and the third optical waveguide.

An eighth aspect of one or more embodiments is the crosstalk measuring method according to any one of the first to sixth aspects, in which the optical device further includes a third optical waveguide arranged in parallel with the first optical waveguide, and in the connecting step, the another end of the first optical waveguide and another end of the third optical waveguide are further optically connected via a second connection optical waveguide having a length different from a length of the first connection optical waveguide, and in the first measuring step, power of emitted light (example of second output light) emitted from the one end of the first optical waveguide is further measured by the OTDR, the emitted light including pulsed light (example of third crosstalk light) in which light generated by crosstalk of the incident light from the first optical waveguide to the third optical waveguide and light (example of fourth crosstalk light) generated by crosstalk of the incident light incident from the first optical waveguide to the third optical waveguide via the second connection optical waveguide, the crosstalk being from the third optical waveguide to the first optical waveguide, are multiplexed, and in the processing step, magnitude of crosstalk between the first optical waveguide and the third optical waveguide is further obtained by using power of the emitted light including pulsed light generated by the crosstalk between the first waveguide and the third optical waveguide.

In this case, as described in the first aspect, crosstalk occurs between the first optical waveguide and the second optical waveguide, and emitted light including pulsed light due to the crosstalk is emitted from the one end of the first optical waveguide. Furthermore, in the present aspect, crosstalk occurs between the first optical waveguide and the third optical waveguide, and emitted light including pulsed light due to the crosstalk is emitted from one end of the first optical waveguide. At this time, because the first connection optical waveguide and the second connection optical waveguide have different lengths, pulsed light due to crosstalk between the first optical waveguide and the second optical waveguide and pulsed light due to crosstalk between the first optical waveguide and the third optical waveguide are emitted from one end of the first optical waveguide at different timings. Therefore, emitted light including pulsed light due to the crosstalk between the first optical waveguide and the second optical waveguide and emitted light including pulsed light due to the crosstalk between the first optical waveguide and the third optical waveguide can each be received by the OTDR, the power of each incident light can be measured, and the magnitude of each crosstalk can be obtained. Therefore, as compared with a case where, after the crosstalk between the first optical waveguide and the second optical waveguide is measured as in the first aspect, the first optical waveguide and the third optical waveguide are optically connected by the connection optical waveguide, and incident light is caused to be incident again from the one end of the first optical waveguide, and the crosstalk between the first optical waveguide and the third optical waveguide is measured, it is possible to easily measure each of the crosstalk between the first optical waveguide and the second optical waveguide and the crosstalk between the first optical waveguide and the third optical waveguide.

Note that, in the eighth aspect, the difference between the length of the first connection optical waveguide and the length of the second connection optical waveguide is preferably larger than the half width of the incident light.

In this case, interference between pulsed light due to the crosstalk between the first optical waveguide and the second optical waveguide and pulsed light due to the crosstalk between the first optical waveguide and the third optical waveguide can be suppressed, and the magnitude of the crosstalk can be more accurately measured.

A ninth aspect of one or more embodiments is the crosstalk measuring method according to any one of the first, second, fifth, and sixth aspects, in which the optical device further includes a third optical waveguide arranged in parallel with the second optical waveguide, and in the connecting step, the one end of the second optical waveguide and one end of the third optical waveguide are optically connected via a second connection optical waveguide, and in the first measuring step, power of emitted light (example of second output light) emitted from the one end of the first optical waveguide via the first connection optical waveguide and the first optical waveguide is further measured by the OTDR, the emitted light including pulsed light in which light (example of third crosstalk light) generated by crosstalk of the incident light incident from the first optical waveguide to the second optical waveguide via the first connection optical waveguide, the crosstalk being from the second optical waveguide to the third optical waveguide, and light (example of fourth crosstalk light) generated by crosstalk of the incident light incident from the second optical waveguide to the third optical waveguide via the second connection optical waveguide, the crosstalk being from the third optical waveguide to the second optical waveguide, are multiplexed, and in the processing step, magnitude of crosstalk between the second optical waveguide and the third optical waveguide is further obtained by using power of the emitted light including pulsed light generated by the crosstalk between the second optical waveguide and the third optical waveguide.

In this case, as described in the first aspect, crosstalk occurs between the first optical waveguide and the second optical waveguide, and emitted light including pulsed light due to the crosstalk is emitted from the one end of the first optical waveguide. Furthermore, in the present aspect, pulsed incident light incident on the second optical waveguide from the another end of the second optical waveguide via the first optical waveguide and the first connection optical waveguide propagates from the second optical waveguide to the third optical waveguide while causing crosstalk. Therefore, crosstalk light that causes crosstalk from the second optical waveguide to the third optical waveguide is also pulsed, and propagates from the another end side to the one end of the third optical waveguide while traveling substantially in parallel with the incident light. The incident light reaching the one end of the second optical waveguide enters the second connection optical waveguide. The crosstalk light reaching the one end of the third optical waveguide enters the second connection optical waveguide from an opposite side of the incident light. As described above, because the propagation speed of the incident light and the propagation speed of the crosstalk light are equal to each other, the incident light and the crosstalk light reaching the one ends at substantially the same time pass each other at substantially a midpoint of the second connection optical waveguide. Then, the incident light enters the third optical waveguide from the one end of the third optical waveguide, and the crosstalk light enters the second optical waveguide from the one end of the second optical waveguide. At this time, a timing at which the incident light enters the third optical waveguide and a timing at which the crosstalk light enters the second optical waveguide are substantially the same. Therefore, the crosstalk light propagates through the second optical waveguide from the one end to the another end side while traveling substantially in parallel with the incident light propagating through the third optical waveguide from the one end to the another end. During this time, the incident light propagating through the third optical waveguide propagates through the second optical waveguide while being crosstalk. Therefore, the light crosstalk from the third optical waveguide to the second optical waveguide is multiplexed with the crosstalk light propagating through the second waveguide. The multiplexed light is pulsed, and the emitted light emitted from the one end of the first optical waveguide via the first connection optical waveguide and the first optical waveguide includes a pulsed light generated by crosstalk between the second optical waveguide and the third optical waveguide. The emitted light emitted from the first optical waveguide is received by the OTDR, and the power of the emitted light is measured.

At this time, pulsed light due to crosstalk between the first optical waveguide and the second optical waveguide and pulsed light due to crosstalk between the second optical waveguide and the third optical waveguide are emitted from the one end of the first optical waveguide at different timings. Therefore, emitted light including light due to the crosstalk between the first optical waveguide and the second optical waveguide and emitted light including light due to the crosstalk between the second optical waveguide and the third optical waveguide can each be received by the OTDR, the power of each incident light can be measured, and the magnitude of each crosstalk can be obtained. Thus, as compared with a case where, after the crosstalk between the first optical waveguide and the second optical waveguide is measured as in the first aspect, the another end of the second optical waveguide and the another end of the third optical waveguide are optically connected by the connection optical waveguide, and incident light is caused to be incident again from the one end of the second optical waveguide, and the crosstalk between the second optical waveguide and the third optical waveguide is measured, it is possible to easily measure each of the crosstalk between the first optical waveguide and the second optical waveguide and the crosstalk between the second optical waveguide and the third optical waveguide.

A tenth aspect of one or more embodiments is the crosstalk measuring method according to any one of the first, second, fifth, and sixth aspects, in which the optical device further includes a third optical waveguide arranged in parallel with the first optical waveguide, and in the connecting step, the one end of the second optical waveguide and another end of the third optical waveguide are optically connected via a second connection optical waveguide, and in the first measuring step, power of emitted light (example of second output light) emitted from the one end of the first optical waveguide is further measured by the OTDR, the emitted light further including pulsed light in which light (example of third crosstalk light) generated by crosstalk of the incident light incident from the OTDR to the first optical waveguide, the crosstalk being from the first optical waveguide to the third optical waveguide and light (example of fourth crosstalk light) generated by crosstalk of the incident light incident from the first optical waveguide to the third optical waveguide via the first connection optical waveguide, the second optical waveguide, and the second connection optical waveguide, the crosstalk being from the third optical waveguide to the first optical waveguide, are multiplexed, and in the processing step, magnitude of crosstalk between the first optical waveguide and the third optical waveguide is further obtained by using power of the emitted light including pulsed light generated by the crosstalk between the first optical waveguide and the third optical waveguide.

In this case, as described in the first aspect, crosstalk occurs between the first optical waveguide and the second optical waveguide, and emitted light including pulsed light due to the crosstalk is emitted from the one end of the first optical waveguide. Furthermore, in the present aspect, the incident light propagating through the first optical waveguide propagates while causing crosstalk from the first optical waveguide to the third optical waveguide, and the crosstalk light causing crosstalk from the first optical waveguide to the third optical waveguide is also pulsed, and propagates from the one end side to the another end of the third optical waveguide while traveling substantially in parallel with the incident light propagating through the first optical waveguide. The incident light reaching the another end of the first optical waveguide enters the first connection optical waveguide. The crosstalk light reaching the another end of the third optical waveguide enters the second connection optical waveguide. Because the propagation speed of the incident light and the propagation speed of the crosstalk light are equal to each other as described above, the incident light and the crosstalk light pass each other at substantially a midpoint of the optical waveguide including the first connection optical waveguide, the second optical waveguide, and the second connection optical waveguide. Then, the incident light enters the third optical waveguide from the another end of the third optical waveguide via the second connection optical waveguide, and the crosstalk light enters the first optical waveguide from the another end of the first optical waveguide via the first connection optical waveguide. At this time, a timing at which the incident light enters the third optical waveguide and a timing at which the crosstalk light enters the first optical waveguide are substantially the same. Thus, the crosstalk light propagates through the first optical waveguide from the another end to the one end while traveling substantially in parallel with the incident light propagating through the third optical waveguide from the another end to the one end. During this time, the incident light propagating through the third optical waveguide propagates through the first optical waveguide while causing crosstalk. Therefore, the light crosstalk from the third optical waveguide to the first optical waveguide is multiplexed with the crosstalk light propagating through the first optical waveguide. The multiplexed light is pulsed, and the emitted light emitted from the one end of the first optical waveguide includes pulsed light generated by the crosstalk between the first optical waveguide and the third optical waveguide. The light emitted from the first optical waveguide is received by the OTDR, and the power of the emitted light is measured.

At this time, pulsed light due to the crosstalk between the first optical waveguide and the second optical waveguide and pulsed light due to the crosstalk between the first optical waveguide and the third optical waveguide are emitted from the one end of the first optical waveguide at different timings. Therefore, emitted light including light due to the crosstalk between the first optical waveguide and the second optical waveguide and emitted light including light due to the crosstalk between the first optical waveguide and the third optical waveguide can each be received by the OTDR, the power of each incident light can be measured, and the magnitude of each crosstalk can be obtained. Thus, as compared with a case where, after the crosstalk between the first optical waveguide and the second optical waveguide is measured as in the first aspect, the another end of the first optical waveguide and the another end of the third optical waveguide are optically connected by the connection optical waveguide, and incident light is caused to be incident again from the one end of the first optical waveguide, and the crosstalk between the first optical waveguide and the third optical waveguide is measured, it is possible to easily measure each of the crosstalk between the first optical waveguide and the second optical waveguide and the crosstalk between the first optical waveguide and the third optical waveguide.

An eleventh aspect of one or more embodiments is the crosstalk measuring method according to any one of first to tenth aspects, in the first measuring step, at least one of a loss of light, a reflection intensity, a bending loss, or a disconnection in the optical device is further measured by the OTDR.

In this case, because the above measurement can be performed in parallel in addition to the measurement of the crosstalk, it is possible to suppress the trouble of measurement other than the crosstalk.

A twelfth aspect of one or more embodiments is the crosstalk measuring method according to any one of first to eleventh aspects, in which, when light having the same power is propagated to the first optical waveguide, the second optical waveguide, and the first connection waveguide, power of optical backscattered light per unit length generated in the first connection optical waveguide is smaller than power of backscattered light per unit length generated in each of the first optical waveguide and the second optical waveguide.

In the first connection optical waveguide, because the power of the backscattered light is small, the ratio of the power of the crosstalk light to the power of the backscattered light is increased, and the crosstalk light can be easily detected.

A thirteenth aspect of one or more embodiments is a crosstalk measuring device for an optical device including a first optical waveguide and a second optical waveguide that include one end and the another end and are parallel to each other, the crosstalk measuring device including a first connection optical waveguide that optically connects the another end of the first optical waveguide and the another end of the second optical waveguide, an OTDR that causes pulsed incident light to enter from the one end of the first optical waveguide, and measures power of emitted light (example of output light) emitted from the one end of the first optical waveguide, the emitted light including pulsed light in which light (example of first crosstalk light) generated by crosstalk of the incident light from the first optical waveguide to the second optical waveguide and light (example of second crosstalk light) generated by crosstalk of the incident light incident from the second optical waveguide to the first optical waveguide via the first connection optical waveguide, the crosstalk being from the first optical waveguide to the second optical waveguide, and a processing unit (example of a processor) that obtains (calculates) magnitude of the crosstalk between the first optical waveguide and the second optical waveguide by using the measured power of the emitted light.

With the crosstalk measuring device of the present aspect, because light in which light incident on the optical waveguide using the OTDR causes crosstalk to another optical waveguide is used, the power of the crosstalk light is large as compared with the case of detecting backscattered light of the crosstalk light as in Patent Literatures 2 and 3. Furthermore, in the crosstalk measuring device of the present aspect, crosstalk light when the incident light propagates from the one end to the another end of the first optical waveguide and crosstalk light when the incident light propagates from the another end to the one end of the second optical waveguide are multiplexed, so that the power of the pulsed light generated by the crosstalk tends to be large. Therefore, with the crosstalk measuring device of the present aspect, crosstalk can be easily measured.

As described above, according to one or more embodiments, a crosstalk measuring method and a crosstalk measuring device capable of easily measuring crosstalk using an OTDR method are provided.

DESCRIPTION OF THE EMBODIMENTS

Figure 1:
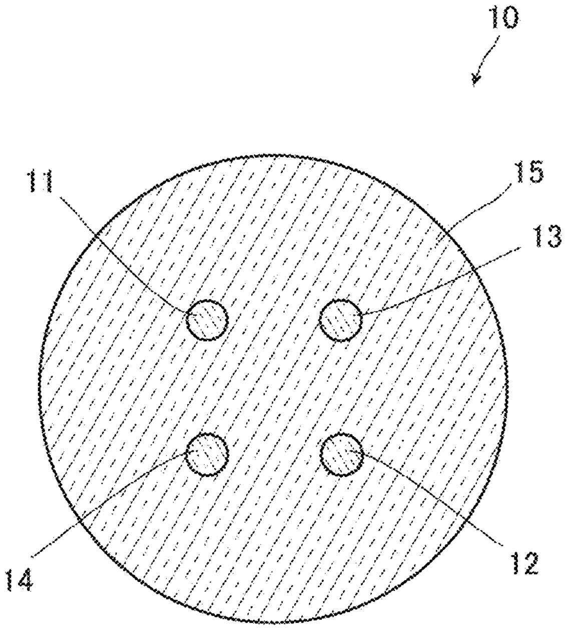
FIG. 1 is a diagram illustrating a cross section perpendicular to a longitudinal direction of a multicore fiber according to a first example.

Hereinafter, embodiments for implementing a crosstalk measuring method and a crosstalk measuring device will be illustrated together with the accompanying drawings. The embodiments exemplified below are intended to facilitate understanding of the present invention and are not intended to limit the present invention. The present invention can be modified and improved from the following embodiments without departing from the gist thereof. In the drawings referred to below, dimensions of each member may be changed for easy understanding.

First Example

FIG. 1 is a diagram illustrating a cross section perpendicular to a longitudinal direction of a multicore fiber according to the present example. A multicore fiber 10 includes a plurality of cores 11 to 14 capable of propagating light and a clad 15 surrounding an outer peripheral surface of each core 11 to 14. The outer peripheral surface of the clad 15 may be surrounded by a coating layer made of resin.

Each of the cores 11 to 14 has one end and another end, and is parallel to each other along the longitudinal direction of the multicore fiber 10. The refractive indexes of the cores 11 to 14 are higher than the refractive index of the clad 15, and each core 11 to 14 can propagate light. Therefore, each of the cores 11 to 14 can be understood as a first optical waveguide to a fourth optical waveguide, and the multicore fiber 10 is an optical device having a plurality of optical waveguides arranged in parallel with each other.

In the present example, the cores 11 to 14 are made of silica glass doped with a dopant such as germanium (Ge) having a high refractive index, and the clad 15 is made of silica glass without any additive. Note that, for example, the cores 11 to 14 may be made of silica glass having no additive, the clad 15 may be made of silica glass to which a dopant such as fluorine (F) that causes the refractive index to be low is added, the core 11 to 14 may be made of silica glass to which a dopant that causes the refractive index to be high is added, and the clad 15 may be made of silica glass to which a dopant that causes the refractive index to be low is added. The dopant having a high refractive index and the dopant having a low refractive index are not particularly limited.

Figure 2:
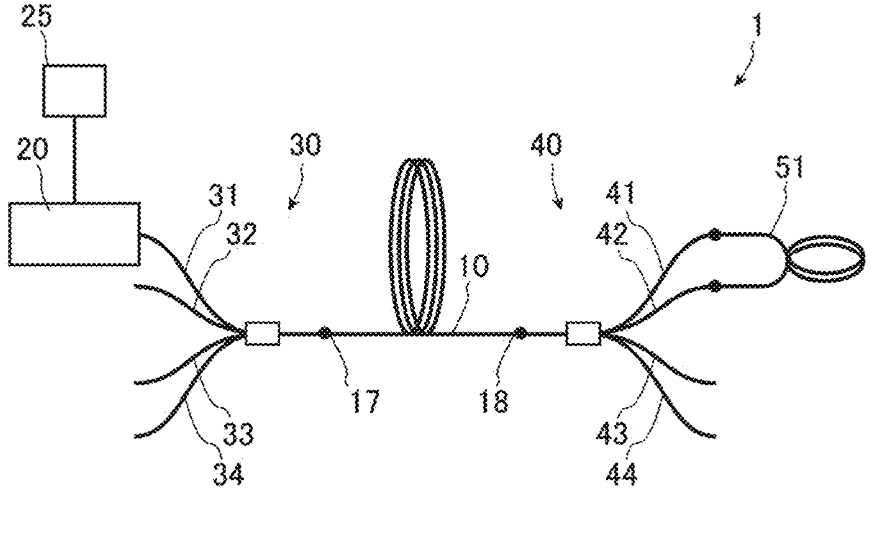
FIG. 2 is a diagram illustrating a crosstalk measuring device according to the first example.

Next, a crosstalk measuring device in the optical device of the present example will be described. FIG. 2 is a diagram illustrating a crosstalk measuring device according to the present example. As illustrated in FIG. 2, a crosstalk measuring device 1 of the present example includes an OTDR 20, a processing unit (example of a processor) 25, and a first optical fiber 51 as main components, and measures crosstalk in a multicore fiber 10. The multicore fiber 10 has one end 17 and another end 18. Note that, in the following description, the one end 17 and the other end 18 may also be described as the one end 17 and the other end 18 of the core 11 to 14.

The OTDR 20 is a device that is connected to an optical fiber or the like and can emit pulsed light, measure a power of light incident from the multicore fiber 10, measure a time from when the pulsed light is emitted until when measured light is incident, measure a loss of light such as a transmission loss, a bending loss, and a connection loss of the optical fiber or the like, detect a disconnection portion of the optical fiber or the like, and measure the amount of reflection of light or the like. In the present example, a fan-in-fan-out device 30 is connected to the OTDR 20.

The fan-in-fan-out device 30 includes a plurality of optical waveguides, not illustrated, individually optically connectable to the cores 11 to 14 at one end 17 of the multicore fiber 10, and optical fibers 31 to 34 each including a core individually optically connected to each optical waveguide. In this example, the core of the optical fiber 31 is connected to the OTDR 20. Further, in this example, the optical waveguide connected to the core of the optical fiber 31 is connected to the core 11 of the multicore fiber 10. Therefore, the optical fiber 31 and the core 11 are optically connected, and light emitted from the OTDR 20 enters the core 11.

A fan-in-fan-out device 40 is connected to the other end 18 of the multicore fiber 10. The fan-in-fan-out device 40 has a configuration similar to that of the fan-in-fan-out device 30, and the cores 11 to 14 of the multicore fibers 10 are individually optically connected to a plurality of optical waveguides (not illustrated) that can be individually optically connected to the cores of optical fibers 41 to 44. In this example, the core 11 and the core of the optical fiber 41 are optically connected, and the core 12 and the core of the optical fiber 42 are optically connected.

The first optical fiber 51 is a single-core fiber, for example, a single-mode fiber. The optical fiber 41 is connected to one end of the first optical fiber 51, and the optical fiber 42 is connected to the other end of the first optical fiber 51. Therefore, the core of the optical fiber 41 and the core of the optical fiber 42 are optically connected via the core of the first optical fiber 51. The core of the first optical fiber 51 can be understood as a first connection waveguide that optically connects the other end of the first optical waveguide that is the core 11 and the other end of the second optical waveguide that is the core 12.

The processing unit 25 is connected to the OTDR 20, and data related to the power of light received by the OTDR 20 is output to the processing unit 25. The processing unit 25 is an arithmetic device that obtains the magnitude of crosstalk using the power of light measured by the OTDR 20. The processing unit 25 can use, for example, an integrated circuit such as a microcontroller, an integrated circuit (IC), a large-scale integrated circuit (LSI), or an application specific integrated circuit (ASIC), or a numerical control (NC) device. Furthermore, in the case where the NC device is used, the processing unit 25 may use a machine learning device or may not use a machine learning device. When data related to the power of light is input from the OTDR 20, the processing unit 25 obtains the magnitude of crosstalk between the core 11 and the core 12 on the basis of data as described later, and outputs data related to the obtained magnitude of crosstalk. Note that the processing unit 25 and the OTDR 20 may be housed in one housing, and a part of the components may be shared.

Figure 3:
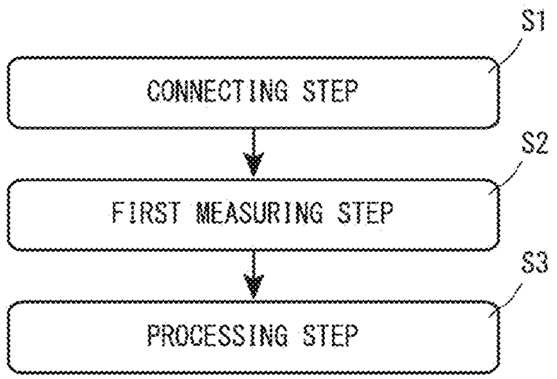
FIG. 3 is a flowchart illustrating a procedure of a crosstalk measuring method according to the first example.

Next, a crosstalk measuring method in the optical device of the present example will be described. FIG. 3 is a flowchart illustrating a procedure of the crosstalk measuring method in the present example. As illustrated in FIG. 3, the crosstalk measuring method of the present example includes a connecting step S1, a first measuring step S2, and a processing step S3.

(Connecting Step S1)

Prior to this step, the multicore fiber 10 as the optical device to be measured is prepared and set in the crosstalk measuring device 1. The length of the multicore fiber 10 is, for example, 21 km. At this time, in this step, the other end 18 of the core 11 and the other end 18 of the core 12 are optically connected via the core of the first optical fiber 51. The length of the first optical fiber 51 is, for example, 10 km. Specifically, a waveguide connected to the optical fiber 41 in the fan-in-fan-out device 40 is connected to the core 11 of the multicore fiber 10, and a waveguide connected to the optical fiber 42 is connected to the core 12. Therefore, in this step, the other end of the first optical waveguide and the other end of the second optical waveguide are optically connected via a first connection optical waveguide, and when light enters from the one end 17 of the core 11 after this step, the light enters the core 12 from the other end 18 of the core 12 via the core of the first optical fiber 51.

In addition, the OTDR 20 and the core 11 are optically connected. Specifically, a waveguide connected to the optical fiber 31 in the fan-in-fan-out device 30 is connected to the core 11 of the multicore fiber 10. Therefore, the light emitted from the OTDR 20 enters the core 11 from the one end 17 of the core 11.

As described above, a state in which the core 11 of the multicore fiber 10 and the OTDR 20 are optically connected, and the core 11 and the core 12 are optically connected via the core of the first optical fiber 51 is a state illustrated in FIG. 2.

(First Measuring Step S2)

In this step, pulsed incident light emitted from the OTDR 20 is caused to enter from the one end 17 of the core 11 which is the first optical waveguide, and power of emitted light emitted from the one end 17 of the core 11 is measured by the OTDR 20, the emitted light including pulsed light in which light generated by crosstalk of the incident light from the core 11 to the core 12 which is the second optical waveguide, and light generated by crosstalk of the incident light incident from the core 11 to the core 12 via the core of the first optical fiber 51 which is the first connection optical waveguide are multiplexed, the crosstalk being from the core 12 to the core 11.

Figure 4:
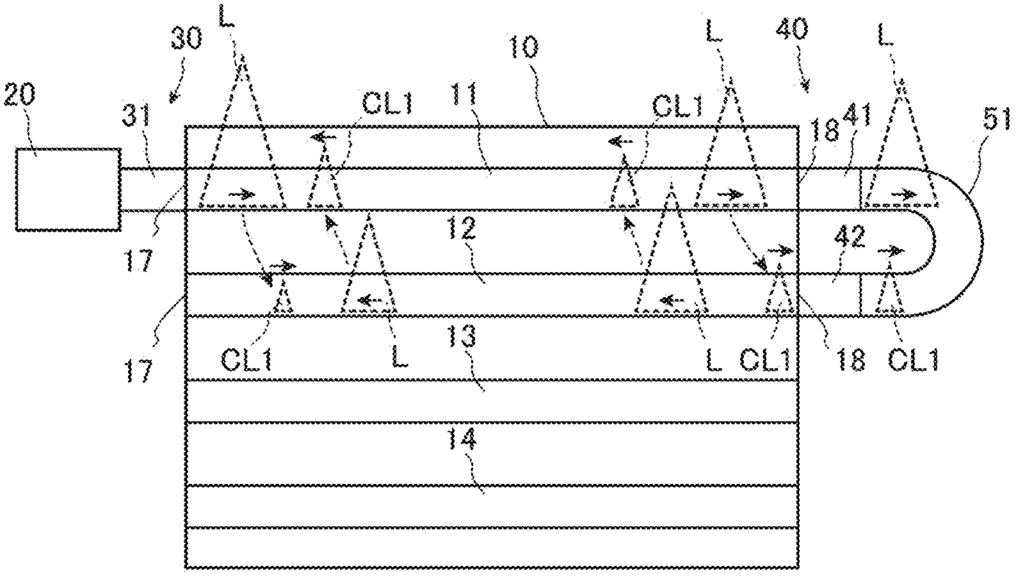
FIG. 4 is a diagram illustrating a state of light propagation in the crosstalk measuring device of FIG. 3.

FIG. 4 is a diagram illustrating a state of light propagation in the crosstalk measuring device of FIG. 3. The above will be specifically described with reference to the drawing. In FIG. 3, the fan-in-fan-out devices 30 and 40 are simplified. First, pulsed light is emitted from the OTDR 20. From the viewpoint of stably performing the later-described crosstalk measurement, the wavelength width of the light is preferably equal to or more than 1 nm, more preferably equal to or more than 3 nm, and still more preferably equal to or more than 5 nm. Further, a wavelength width of this light is preferably equal to or less than 30 nm from the viewpoint of measuring crosstalk at a certain specific wavelength. In addition, it is preferable that a pulse width of power of the light emitted from the OTDR 20 is appropriately adjusted so that emitted light including crosstalk light described later is not saturated. In this case, an attenuator may be interposed between the OTDR 20 and the optical fiber 31.

The pulsed light emitted from the OTDR 20 enters the core 11 from the one end 17 of the core 11 as incident light, and propagates through the core 11 from the one end 17 to the other end 18. The pulsed incident light propagating through the core 11 propagates from the core 11 to the core 12 while causing crosstalk. Since the incident light is pulsed, crosstalk light CL1 that causes crosstalk from the core 11 to the core 12 is also pulsed and propagates from the one end 17 side to the other end 18 of the core 12 while traveling substantially in parallel with the incident light L. During this time, since the crosstalk occurs from the core 11 to the core 12, the power of the incident light L decreases according to the distance propagated through the core 11, and the power of the crosstalk light CL1 increases according to the distance propagated through the core 12. Since the speed of light propagating through the core 11 and the core 12 is the same, the incident light L and the crosstalk light CL1 reach the other end 18 substantially at the same time.

Next, the incident light L and the crosstalk light CL1 are incident on the core of the first optical fiber 51 substantially simultaneously via the fan-in-fan-out device 40. At this time, the crosstalk light CL1 enters the core of the first optical fiber 51 from the side opposite to the side on which the incident light L is incident. The incident light L incident on the core of the first optical fiber 51 and the crosstalk light CL1 pass by each other at substantially a midpoint of the first optical fiber 51. The incident light L and the crosstalk light CL1 reach different ends of the first optical fiber 51 substantially simultaneously. Then, through the fan-in-fan-out device 40, the incident light L enters the core 12 from the other end 18 of the core 12, and the crosstalk light CL1 enters the core 11 from the other end 18 of the core 11. At this time, the incident light L and the crosstalk light CL1 are substantially simultaneously incident on the cores 12 and 11, respectively. Note that, even when the lengths of the optical fibers 41 and 43 in the fan-in-fan-out device 40 are different, the incident light L and the crosstalk light CL1 are respectively incident on the cores 12 and 11 substantially simultaneously.

The incident light L incident on the core 12 and the crosstalk light CL1 incident on the core 11 propagate through the cores 12 and 11 toward the one end 17 while traveling substantially in parallel. During this time, the incident light L propagating through the core 12 propagates to the core 11 while causing crosstalk. Therefore, the light crosstalk from the core 12 to the core 11 is multiplexed with the crosstalk light CL1 propagating through the core 11. The multiplexed light is pulsed and propagates while gradually increasing power. From the one end 17 of the core 11, emitted light in which light such as backscattered light is multiplexed with the pulsed crosstalk light CL1 is emitted. Therefore, the emitted light includes the pulsed crosstalk light CL1.

The emitted light emitted from the core 11 enters the OTDR 20 via the fan-in-fan-out device 30 and received by the OTDR 20, and its power is measured by the OTDR 20.

Figure 5:
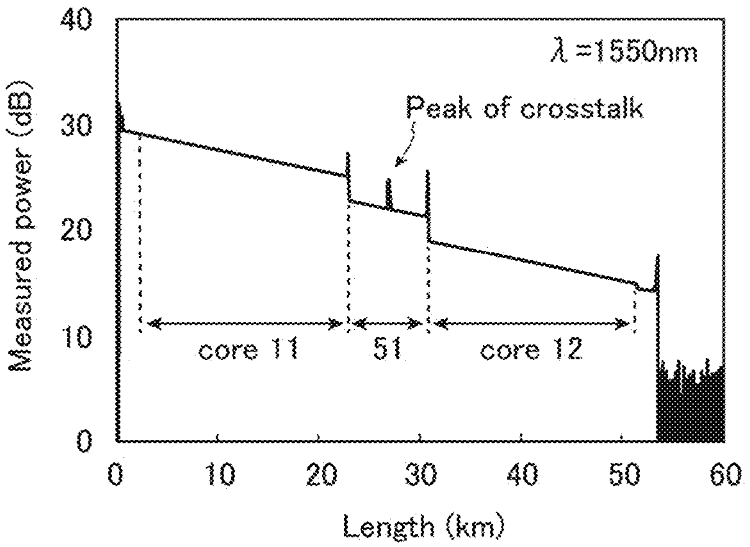
FIG. 5 is a diagram illustrating a measurement result in an OTDR.

FIG. 5 is a diagram illustrating a measurement result of emitted light received by the OTDR 20. In FIG. 5, the horizontal axis represents the propagation distance of the incident light L, and the vertical axis represents the power of the emitted light received by the OTDR 20. Note that the vertical axis in FIG. 5 represents the ratio of the power of the emitted light to a predetermined power defined in the OTDR 20 in decibels. For example, when the predetermined power is 1 mw, the unit of the vertical axis may be indicated by dBm. As illustrated in FIG. 5, in a section in which the incident light L propagates through the core 11 and a section in which the incident light L propagates through the core 12, backscattered light is measured as emitted light. The inclination of the line indicating the emitted light in these sections indicates a loss of the incident light L per unit length due to backscattering. Further, pulsed light is measured at the boundary between the section of the core 11 and a section of the first optical fiber 51 and the boundary between the section of the first optical fiber 51 and the section of the core 12, and this light indicates reflection in the fan-in-fan-out device 40 or the like.

Pulsed light is measured at substantially the midpoint of the section indicating the first optical fiber 51. As described above, since the incident light L and the crosstalk light CL1 pass each other at substantially the midpoint of the first optical fiber 51, this pulsed light indicates the crosstalk light CL1. In addition, also in the section where the incident light L propagates through the first optical fiber 51, the backscattered light is measured as the emitted light. Therefore, the power of the emitted light measured at substantially the midpoint of the first optical fiber 51 includes the power of the crosstalk light CL1 and the power of the backscattered light.

As described above, a pulse indicating the power of the crosstalk light CL1 is illustrated at substantially the midpoint of the section indicating the first optical fiber 51. The pulse width of the incident light L and the pulse width of the crosstalk light CL1 are substantially the same. Therefore, in order to prevent the pulse indicating the crosstalk light CL1 from being applied to an end of the first optical fiber 51, the length of the core of the first optical fiber 51 as the first connection optical waveguide is preferably longer than the half width of the incident light L. That is, in a case where the length of the first optical fiber 51 is $L_{SCF}$, the half-value time width of the incident light L is $\Delta T_{pulse}$, the refractive index of the core of the first optical fiber 51 is n, and the high speed is c, the following expression is preferably satisfied.

$$L_{SCF} > \Delta T_{pulse} \times c/n$$

Note that it is more preferable to satisfy the following expression from the viewpoint of further suppressing the influence of the end of the first optical fiber 51 from affecting the pulse.

$$L_{SCF} > 1.2 \times \Delta T_{pulse} \times c/n$$

The OTDR 20 outputs data related to the measured power of the emitted light to the processing unit 25.

(Processing Step S3)

Figure 6:
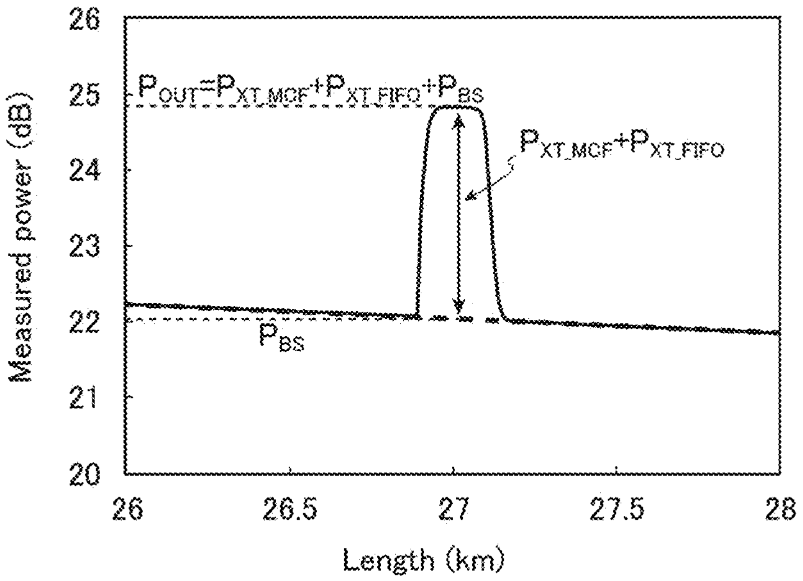
FIG. 6 is an enlarged diagram of a part of FIG. 5.

In this step, the magnitude of crosstalk between the core 11 and the core 12 is obtained using the measured power of the emitted light. FIG. 6 is an enlarged diagram of emitted light measured at substantially the midpoint of the first optical fiber 51 in FIG. 5. As described above, the backscattered light is also generated in the first optical fiber 51. Therefore, the power of the backscattered light is measured in a region other than a region where the pulsed light is indicated. Accordingly, the processing unit 25 first obtains power $P_{BS}$ of the backscattered light in the region where the pulsed light is indicated from power of the emitted light in a region other than the region where the pulsed light including the crosstalk light CL1 is indicated on the basis of data input from the OTDR 20. Specifically, the processing unit 25 obtains the power $P_{BS}$ of the backscattered light by, for example, linearly approximating the power of the emitted light in the region other than the region where the pulsed light is indicated. Next, the processing unit 25 obtains a difference between power Pour of the emitted light in the region where the pulsed light is indicated and the obtained power $P_{BS}$ of the backscattered light. This difference is the power of the pulsed light. However, the power of the pulsed light includes power $P_{XT\_MCF}$ of the crosstalk light CL1 and power $P_{XT\_FIFO}$ of crosstalk in the fan-in-fan-out devices 30 and 40. When the power $P_{XT\_FIFO}$ is negligibly small, the power of the pulsed light only needs to be set to power $P_{XT\text{-}MCF}$ of the crosstalk light CL1. However, it is preferable to set the power obtained by removing the power $P_{XT\_FIFO}$ from the power of the pulsed light as the power $P_{XT\_MCF}$ of the crosstalk light CL1 from the viewpoint of more accurately obtaining the power $P_{XT\_MCF}$.

The power $P_{XT\_FIFO}$ can be measured in advance. For example, in the crosstalk measuring device 1, the fan-in-fan-out device 30 and the fan-in-fan-out device 40 are directly connected. In this manner, the length of the multicore fiber 10 becomes 0, and when the power of the emitted light is measured in the same manner as in the first measuring step S2, the power Pour of the pulsed light measured at substantially the midpoint of the first optical fiber 51 includes the power $P_{XT\_FIFO}$ and the power $P_{BS}$. Thus, the power: $P_{XT\_FIFO}$ can be obtained by obtaining the difference between the power Pour and the power $P_{BS}$ in a manner similar to that described above.

The processing unit 25 converts the obtained power $P_{XT\_MCF}$ of the crosstalk light CL1 into the magnitude of the crosstalk and outputs the magnitude of the crosstalk. At this time, the processing unit 25 may convert the magnitude of the crosstalk into decibels indicating the ratio of the power of the incident light L emitted from the one end 17 of the core 12 and output the decibels. In addition, the processing unit 25 may perform decibel conversion indicating a ratio with respect to the predetermined power defined in the OTDR 20 illustrated in FIGS. 5 and 6 and output the result. In this way, the magnitude of crosstalk is obtained.

Note that, in this step, the processing unit 25 may further obtain the magnitude of the crosstalk between the core 11 and the core 12, for example, on the basis of the obtained magnitude of the crosstalk between the core 11 and the core 13. In this case, on the basis of the magnitude of the crosstalk between the core 11 and the core 12, the processing unit 25 obtains the magnitude of the crosstalk between the core 11 and the core 13 using, for example, a relational expression indicating a relationship between the magnitude of the crosstalk between the core 11 and the core 12 and the magnitude of the crosstalk between the core 11 and the core 13. In this case, the multicore fiber 10 which is an optical device includes the core 13 which is the third optical waveguide, parallel to the core 11 which is the first optical waveguide, and thus, in the processing step S3, the magnitude of the crosstalk between the first waveguide and the third waveguide is further obtained on the basis of the obtained magnitude of the crosstalk between the first waveguide and the second waveguide. In this case, the magnitude of the crosstalk between the core 11 and the core 13 can be easily obtained without measuring the power of the light due to the crosstalk between the core 11 and the core 13. In addition, the magnitude of the crosstalk between the core 11 and the core 14 may be obtained similarly to the magnitude of the crosstalk between the core 11 and the core 13.

Next, reliability of measurement of crosstalk in the present example will be described.

Figure 7:
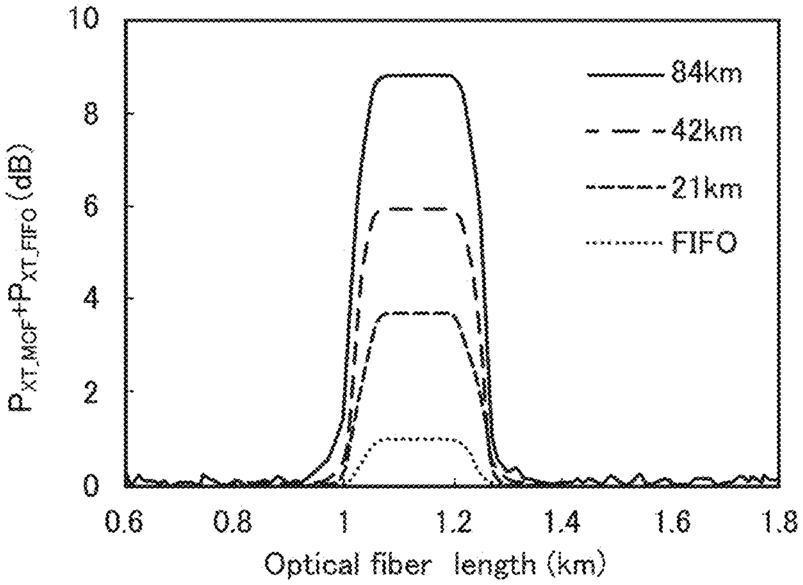
FIG. 7 is a diagram illustrating power of crosstalk light measured by the OTDR in a case where a length of the multicore fiber is changed.

FIG. 7 is a diagram illustrating the power of pulsed light including the crosstalk light CL1 in the multicore fiber 10 and the crosstalk light in the fan-in-fan-out devices 30 and 40 measured by the OTDR 20 as in the above embodiments, and the power of backscattered light is excluded from the power of light incident on the OTDR 20. As illustrated in FIG. 7, in this example, the lengths of the multicore fiber 10 are set to 0 km, 21 km, 42 km, and 84 km. FIFO indicated by a dotted line in FIG. 7 indicates that the fan-in-fan-out device 30 and the fan-in-fan-out device 40 are directly connected and the length of the multicore fiber 10 is 0 km, and corresponds to the power $P_{XT\_FIFO}$ described above. As illustrated in FIG. 7, it can be seen that the longer the multicore fiber 10, the larger the power of light generated by crosstalk.

Next, the fan-in-fan-out devices 30 and 40 were connected to the multicore fibers 10 used for the measurement of FIG. 7, and the magnitude of crosstalk was measured by the PM method. Specifically, light is incident from the core of the optical fiber 31 of the fan-in-fan-out device 30 optically connected to the core 11 of the multicore fiber 10, and light emitted from the cores of the optical fibers 41 and 42 of the fan-in-fan-out device 40 optically connected to the core 12 of the multicore fiber 10 is measured to measure the magnitude of crosstalk between the core 11 and the core 12. Therefore, the magnitude of the crosstalk is the ratio of the power of the crosstalk light to the power of the incident light L emitted from the one end 17 of the core 12. The above results are indicated in Table 1 below.

TABLE 1

| peak size and crosstalk value at each fiber lengths | | |
|---|---|---|
| Fiber Length (km) | Peak size (dB) | Crosstalk (dB) |
| 0 (Only FIFO) | 1.0 | −57.1 |
| 21 | 3.7 | −48.3 |
| 42 | 5.9 | −42.7 |
| 84 | 8.8 | −37.0 |

Figure 8:
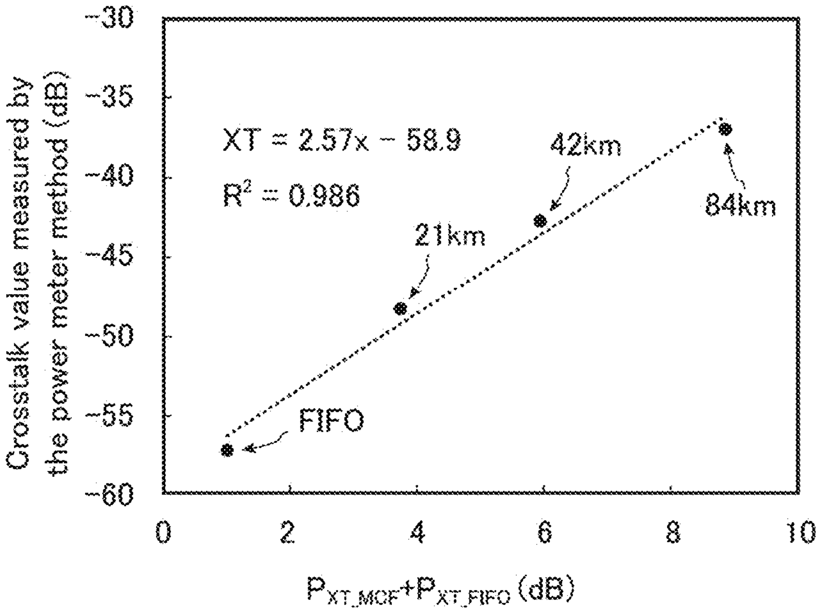
FIG. 8 is a diagram illustrating a relationship between power of crosstalk light measured in the first example and power of crosstalk light measured by a PM method.

Peak Size in Table 1 is the power of the pulsed light illustrated in FIG. 7, and Crosstalk is the magnitude of crosstalk measured by the PM method. FIG. 8 is a diagram illustrating a relationship between the power of the crosstalk light measured in the present example and the power of the crosstalk light measured by the PM method illustrated in Table 1. As illustrated in FIG. 8, these relationships are linear. Therefore, it is illustrated that the power of the crosstalk light measured by the crosstalk measuring method of the present example is substantially correlated with the magnitude of the crosstalk measured by the PM method. When each point illustrated in FIG. 8 is approximated to a straight line, the straight line is expressed by the following expression.

$$XT = 2.57\times -58.9$$

$$R^2 = 0.986$$

In this expression, XT represents the magnitude of crosstalk, x represents the power of the crosstalk light, and $R^2$ is a determination coefficient. In this way, it is illustrated that the coefficient of determination is considerably close to 1 and the correlation is high.

Next, a plurality of other multicore fibers 10 was prepared, and the magnitude of crosstalk was measured as in the present example. At this time, the power of the pulsed crosstalk light was measured similarly to the first measuring step S2, and the magnitude of the power was substituted into x in the above expression to obtain the magnitude of crosstalk indicated by decibels on the vertical axis in FIG. 8. In addition, the crosstalk of each multicore fiber 10 was measured by the PM method. The results are indicated in Table 2.

TABLE 2

| The calculated and measured crosstalk valued | | |
|---|---|---|
| Fiber Length (km) | XT calculation (dB) | XT measurement (dB) |
| 16 | −47.4 | −47.2 |
| 50 | −45.2 | −43.9 |
| 62 | −39.7 | −38.9 |

In Table 2, XT calculation is the magnitude of crosstalk obtained using the above-described linear approximation expression, and XT measurement is the magnitude of crosstalk measured by the PM method. As indicated in Table 2, the result of the measurement of the crosstalk according to the present example and the result of the measurement of the crosstalk according to the PM method substantially matched each other. Therefore, in the processing step S3, in a case where the processing unit 25 converts the magnitude of the crosstalk into a decibel indicating the ratio of the power of the incident light L output from the one end 17 of the core

12, the magnitude XT of the crosstalk may be obtained from the expression of linear approximation with the power of the pulsed crosstalk light as X.

From the above, it was illustrated that the measurement of the crosstalk of the present example has reliability.

Next, measurement of crosstalk of the present example will be described using a mathematical expression.

The length of the multicore fiber 10 is defined as $L_{MCF}$, and the length of the first optical fiber 51 is defined as $L_{SCF}$. Further, power when the incident light L enters the core 11 of the multicore fiber 10 from the one end 17 is defined as $P_0$, power when the incident light L is emitted from the other end 18 is defined as $P'_0$, and power when the incident light L enters the core 12 from the other end 18 and is emitted from the one end 17 of the core 12 is defined as $P''_0$. In addition, power of crosstalk light emitted from the core 12 after crosstalk from the core 11 to the core 12 while the incident light L propagates through the core 11 is defined as $P_{XT}$ ($L_{MCF}$), and power of crosstalk light emitted from the core 11 after crosstalk between the core 11 and the core 12 while the incident light L propagates through the core 11 and the core 12, that is, while the incident light L reciprocates through the multicore fiber 10 is defined as $P_{XT}$ ($2L_{MCF}$).

For the sake of simplicity, in the description using the following expression, the multicore fiber 10 will be described as a two-core fiber including the cores 11 and 12 but not including the cores 13 and 14. In addition, transmission losses of the multicore fiber 10 and the first optical fiber 51 are ignored, and losses and crosstalk in the fan-in-fan-out devices 30 and 40 are also ignored. In this case, referring to Expressions (21a) and (21b) of Non Patent Literature 1, $P'_0$, $P''_0$, $P_{XT}$ ($L_{MCF}$), and $P_{XT}(2L_{MCF})$ are expressed by the following Expressions (1) to (4).

$$P'_0 = P_0\times\{1+\exp(-2h\times L_{MCF})\}/2 \tag{1}$$

$$P''_0 = P_0\times\{1+\exp(-2h\times 2L_{MCF})\}/2 \tag{2}$$

$$P_{XT}(L_{MCF}) = P_0\times\{1-\exp(-2h\times L_{MCF})\}/2 \tag{3}$$

$$P_{XT}(2L_{MCF}) = P_0\times\{1-\exp(-2h\times 2L_{MCF})\}/2 \tag{4}$$

Note that, in the above expression, h is a power coupling coefficient between the core 11 and the core 12 that cause crosstalk. The unit of the power of the light here is not expressed in decibels, but is expressed in watts, for example.

In addition, magnitude indicating the magnitude of crosstalk from the core 11 to the core 12 while the incident light L propagates through the core 11 as a ratio to $P'_0$ in decibels is defined as XT($L_{MCF}$), and magnitude indicating the magnitude of crosstalk between the core 11 and the core 12 while the incident light L propagates through the core 11 and the core 12, that is, while the incident light L reciprocates through the multicore fiber 10 as a ratio to $P''_0$ in decibels is defined as XT ($2L_{MCF}$). In this case, XT ($L_{MCF}$) and XT ($2L_{MCF}$) are expressed by the following Expressions (5) and (6).

$$XT(L_{MCF}) = 10\times\log_{10}\{P_{XT}(L_{MCF})/P'_0\} \tag{5}$$

$$XT(2L_{MCF}) = 10\times\log_{10}\{P_{XT}(2L_{MCF})/P''_0\} \tag{6}$$

As described above, the OTDR 20 is optically connected to the core 11 at the one end 17 of the multicore fiber 10. Therefore, $P''_0$ cannot be measured in the OTDR. Therefore, to obtain the XT ($2L_{MCF}$) from the power of the light measured by the OTDR 20, Expression (6) only needs to be used as follows.

As described above, the incident light L and the crosstalk light CL1 pass by each other at substantially the midpoint of the first optical fiber 51. At this time, the propagation distance of the incident light L is a half $L_{SCF}/2$ of the length $L_{MCF}$ of the multicore fiber 10 and the length of the first optical fiber 51. Therefore, the distance from the midpoint of the first optical fiber 51 to the one end 17 of the multicore fiber 10 is $L_{MCF}+L_{SCF}/2$. When the intensity of the backscattered light from the midpoint of the first optical fiber 51 measured by the OTDR 20 is $P_{BS}$ ($L_{MCF}+L_{SCF}/2$), $P_{BS}$ ($L_{MCF}+L_{SCF}/2$) is expressed by Expression (7).

$$P_{BS}(L_{MCF}+L_{SCF}/2)=P_0\times\alpha_{S\_SCF}\times B_{SCF}\times\{1+\exp(-2h\times 2L_{MCF})\}/2 \quad (7)$$

In Expression (7), $\alpha_{S\_SCF}$ represents the probability that the incident light L is Rayleigh scattered by the first optical fiber 51 with the backscattering coefficient of the first optical fiber 51, and $B_{SCF}$ represents the probability that the light Rayleigh scattered at a capture rate of the first optical fiber 51 propagates through the core of the first optical fiber 51 toward the core 11 of the multicore fiber 10.

Expression (8) is derived from Expressions (2) and (7).

$$P_{BS}(L_{MCF}+L_{SCF}/2)=\alpha_{S\_SCF}\times B_{SCF}\times P''_0 \quad (8)$$

When $P''_0$ is obtained from Expression (8) and substituted into Expression (6), Expression (9) is obtained.

$$\begin{aligned}XT(2L_{SCF}) &= 10\times\log_{10}\{P_{XT}(2L_{MCF})/P''_0\} \quad (9)\\ &= 10\times\log_{10}\{\alpha_{S\_SCF}\times B_{SCF}\times P_{XT}(2L_{MCF})/\\ &\quad P_{BS}(L_{MCF}+L_{SCF}/2)\}\\ &= 10\times\log_{10}(\alpha_{S\_SCF}\times B_{SCF})+10\times\log_{10}\{P_{XT}(2L_{MCF})\}-\\ &\quad 10\times\log_{10}\{P_{BS}(L_{MCF}+L_{SCF}/2)\}\end{aligned}$$

As described in the processing step S3, the $P_{BS}$ ($L_{MCF}+L_{SCF}/2$) can be obtained from the power of the emitted light in the region other than the region in which the pulsed crosstalk light is indicated on the basis of data input from the OTDR 20. In addition, in the present description, since the crosstalk in the fan-in-fan-out devices 30 and 40 is ignored, the power $P_{XT\_MCF}$ described in the processing step S3 is $P_{XT}$ ($2L_{MCF}$). Therefore, $P_{XT}$ ($2L_{MCF}$) can be obtained as described in the processing step S3. Therefore, by separately calculating the first term of Expression (9), XT ($2L_{MCF}$) can be obtained from Expression (9). Note that the first term of Expression (9) may be obtained from the relationship between the magnitude of the crosstalk obtained in advance by the PM method and $P_{BS}$ ($L_{MCF}+L_{SCF}/2$) and $P_{XT}(2L_{MCF})$ measured by the OTDR 20, or the first term of Expression (9) may be obtained by measuring the first optical fiber 51 in advance.

As described above, the crosstalk measuring method according to the present example includes the connecting step S1 of optically connecting the other end 18 of the core 11 that is the first optical waveguide and the other end 18 of the core 12 that is the second optical waveguide via the core of the first optical fiber 51 that is the first connection optical waveguide; the first measuring step S2 of causing pulsed incident light L emitted from the OTDR 20 to enter from the one end 17 of the core 11, and measuring power of emitted light emitted from the one end 17 of the core 11 by the OTDR 20, the emitted light including pulsed crosstalk light CL1 in which light generated by crosstalk of the incident light L from the core 11 to the core 12 and light generated by crosstalk of the incident light L incident from the core 11 to the core 12 via the core of the first optical fiber 51, the crosstalk being from the core 12 to the core 11, are multiplexed, the processing step S3 of obtaining the magnitude of the crosstalk between the core 11 and the core 12 using the measured power of the emitted light.

In addition, the crosstalk measuring device of the present example includes the core of the first optical fiber 51 that optically connects the other end 18 of the core 11 and the other end 18 of the core 12, the OTDR 20 that causes the pulsed incident light L to enter from the one end 17 of the core 11, and measures power of emitted light emitted from the one end 17 of the core 11, the emitted light including pulsed crosstalk light CL1 in which light generated by crosstalk of the incident light L from the core 11 to the core 12 and light generated by crosstalk of the incident light L incident from the core 11 to the core 12 via the core of the first optical fiber 51, the crosstalk being from the core 12 to the core 11 are multiplexed, and the processing unit 25 that obtains the magnitude of the crosstalk between the core 11 and the core 12 by using the measured power of the emitted light.

By such a crosstalk measuring method and a crosstalk measuring device, since light in which the light incident on the core 11 using the OTDR 20 causes crosstalk to the core 12 is used, the power of the crosstalk light is large as compared with the case of detecting the backscattered light of the crosstalk light as in Patent Literatures 2 and 3. Furthermore, in the crosstalk measuring method and the crosstalk measuring device of the present example, since light that causes crosstalk when the incident light L propagates from the one end 17 to the other end 18 of the core 11 and light that causes crosstalk when the incident light L propagates from the other end 18 to the one end 17 of the core 12 are multiplexed, the power of the pulsed crosstalk light CL1 generated by the crosstalk tends to be large. Therefore, by the crosstalk measuring method and the crosstalk measuring device of the present aspect, the crosstalk can be easily measured.

Second Example

Next, a second example of one or more embodiments will be described in detail with reference to FIGS. 9 and 10. Note that the same or equivalent components as those in the above embodiments are denoted by the same reference numerals, and redundant description is omitted unless otherwise specified.

Figure 9:
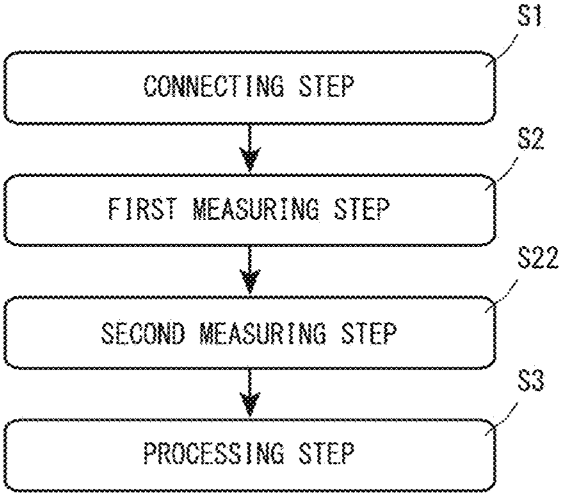
FIG. 9 is a flowchart illustrating a procedure of a crosstalk measuring method according to a second example.
Figure 10:
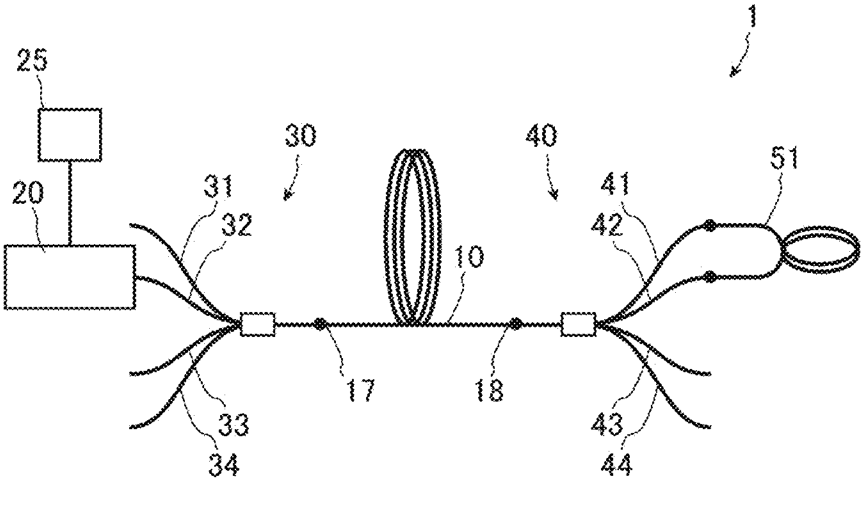
FIG. 10 is a diagram illustrating a state of a crosstalk measuring device in a second measuring step of the second example.

FIG. 9 is a flowchart illustrating a procedure of a crosstalk measuring method in the present example. As illustrated in FIG. 9, the method for measuring crosstalk according to the present example is different from the method for measuring crosstalk according to the first example in that a second measuring step S22 is included. In the present example, the connecting step S1 and the first measuring step S2 are performed similarly to those in the crosstalk measuring method of the first example.

(Second Measuring Step S22)

In the present example, this step is performed after the first measuring step S2. FIG. 10 is a diagram illustrating a state of the crosstalk measuring device in this step. As illustrated in FIG. 10, in this step, the core of the optical fiber 32 of the fan-in-fan-out device 30 is connected to the OTDR 20. The optical waveguide connected to the core of the optical fiber 32 is connected to the core 12 of the multicore fiber 10. Therefore, the optical fiber 32 and the core 12 are optically connected, and the light emitted from the OTDR 20 enters the core 12 from the one end 17.

In this step, pulsed incident light emitted from the OTDR 20 is caused to enter from the one end 17 of the core 12 as the second optical waveguide. In this case, a multi-channel OTDR may be used, and in the first measuring step S2, light may be incident on the core 11 from one channel of the OTDR 20, and in this step, light may be incident on the core 12 from the other channel of the OTDR 20. In this step, the power of the incident light L incident on the core 12 from the OTDR 20 is similar to the power of the incident light L incident on the core 12 from the OTDR 20 in the first measuring step S2. The incident light L incident on the core 12 causes crosstalk from the core 12 to the core 11 which is the first optical waveguide. The incident light L propagating to the other end 18 of the core 12 enters the core 11 from the core 12 via the core of the first optical fiber 51 which is the first connection optical waveguide. The incident light L incident on the core 11 causes crosstalk from the core 11 to the core 12. As described above, the emitted light including the pulsed crosstalk light CL2 in which the light generated by the crosstalk from the core 12 to the core 11 and the light generated by the crosstalk from the core 11 to the core 12 are multiplexed is emitted from the one end 17 of the core 12.

The OTDR 20 measures the power of the emitted light. The distribution of the power of the emitted light measured in this step is substantially the same as the power of the emitted light measured in the first measuring step illustrated in FIG. 5. However, the description of the core 11 and the description of the core 12 in FIG. 5 are interchanged and read.

(Processing Step S3)

In the processing step S3 of the present example, first, the processing unit 25 inverts the range from the core 12 to the core 11 in the distribution of the power of the light measured in the second measuring step S22 along the horizontal axis. Then, the processing unit 25 calculates an arithmetic mean of the distribution of the power of the light in the range from the core 11 to the core 12 measured in the first measuring step S2 and a distribution of power of light inverted in this step. In this way, the power of light backscattered when propagating through the core 11 from the one end 17 to the other end 18 and the power of light backscattered when propagating through the core 11 from the other end 18 to the one end 17 are averaged, and an inclination of the distribution of the power of light in the range of the core 11 in FIG. 5 is substantially eliminated. Similarly, an inclination of the distribution of the power of light indicating the range of the core 12 in FIG. 5 and an inclination of the distribution of the power of light in the range of the first optical fiber 51 are substantially eliminated. In addition, crosstalk light obtained by averaging the crosstalk light CL1 and the crosstalk light CL2 appears to be pulsed at substantially the midpoint of the first optical fiber 51.

Next, in this step, the processing unit 25 obtains the magnitude of the crosstalk light from the averaged power of the pulsed crosstalk light in the same manner as in the first example.

As described above, the crosstalk measuring method of the present example includes, in addition to the crosstalk measuring method of the first example, the second measuring step S22 of causing pulsed incident light L emitted from the OTDR 20 to enter the one end 17 of the core 12, and measuring power of emitted light emitted from the one end 17 of the core 12 by the OTDR 20, the emitted light including pulsed light in which light generated by crosstalk of the incident light L from the core 12 to the core 11 and light generated by crosstalk of the incident light L incident from the core 12 to the core 11 via the core of the first optical fiber 51, the crosstalk being from the core 11 to the core 12, are multiplexed, and in the processing step S3, the magnitude of the crosstalk between the core 11 and the core 12 is obtained using the power of the emitted light measured in the first measuring step S2 and the power of the emitted light measured in the second measuring step S22.

Further, in the crosstalk measuring device of the present example, in addition to the crosstalk measuring device of the first example, the OTDR 20 causes pulsed incident light L to enter from the one end 17 of the core 12, and measures power of emitted light emitted from the one end 17 of the core 12 by the OTDR 20, the emitted light including pulsed light in which light generated by crosstalk of the incident light L from the core 12 to the core 11 and light generated by crosstalk of the incident light L incident from the core 12 to the core 11 via the core of the first optical fiber 51, the crosstalk being from the core 11 to the core 12, are multiplexed, and the processing unit 25 obtains the magnitude of the crosstalk between the core 11 and the core 12 using the power of the emitted light emitted from the one end 17 of the core 11 by the incident light L incident from the core 11, and the power of the emitted light emitted from the one end 17 of the core 12 by the incident light L incident from the core 12.

the crosstalk measuring method and the crosstalk measuring device of the present example, since the crosstalk light CL1 generated by propagating the incident light L from the core 11 to the core 12 and the crosstalk light CL2 generated by propagating the incident light L from the core 12 to the core 11 are used, the magnitude of the crosstalk can be more accurately obtained as compared with the case of using only the crosstalk light CL1 generated by propagating the incident light L from the core 11 to the core 12.

In addition, the power of the incident light L incident on the core 11 in the first measuring step S2 and the power of the incident light L incident on the core 12 in the second measuring step S22 are equal to each other, and in the processing step S3, the magnitude of the crosstalk between the core 11 and the core 12 is obtained using a result of averaging the power of the emitted light measured in the first measuring step S2 and the power of the emitted light measured in the second measuring step S22. By using such an averaging process, the magnitude of crosstalk can be easily and accurately obtained. Note that the power of the incident light L incident on the core 11 in the first measuring step S2 and the power of the incident light L incident on the core 12 in the second measuring step S22 may be different from each other. In this case, in processing step S3, the processing is performed in consideration of the power of the incident light L. For example, when the power of the incident light L incident on the core 12 in the second measuring step S22 is twice the power of the incident light L incident on the core 11 in the first measuring step S2, the power of the emitted light is halved and the averaging process is performed in the processing step S3.

Third Example

Next, a third example of one or more embodiments will be described in detail with reference to FIGS. 11 and 12. Note that the same or equivalent components as those in the above embodiments are denoted by the same reference numerals, and redundant description is omitted unless otherwise specified.

Figure 11:
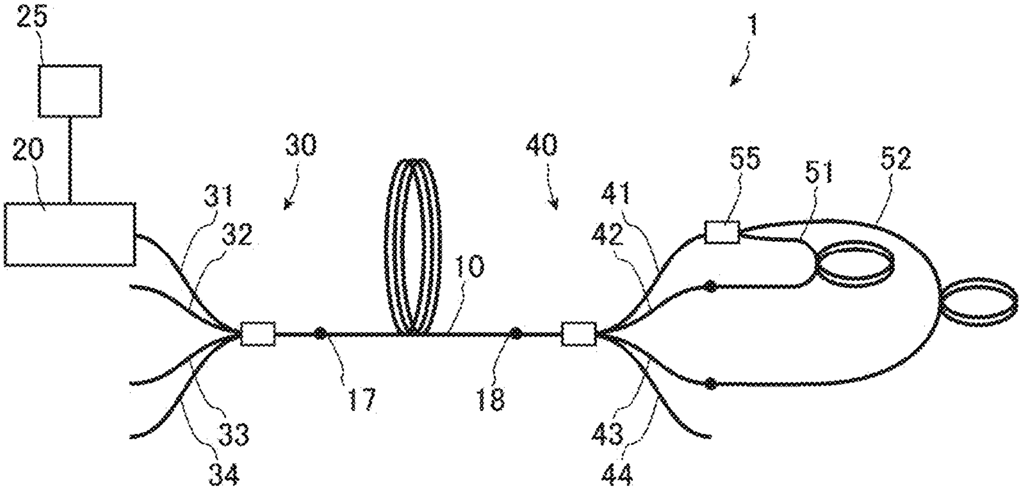
FIG. 11 is a diagram illustrating a crosstalk measuring device according to a third example.

FIG. 11 is a diagram illustrating a crosstalk measuring device 1 according to the present example. The crosstalk measuring device 1 of the present example is different from the crosstalk measuring device 1 of the first example in that the optical fiber 41 of the fan-in-fan-out device 40 is connected to one ends of the first optical fiber 51 and a second optical fiber 52 via a coupler 55, and the other end of the second optical fiber 52 is connected to the optical fiber 43 of the fan-in-fan-out device 40. The optical waveguide connected to the core of the optical fiber 43 is connected to the core 13 of the multicore fiber 10, and the optical fiber 43 and the core 13 are optically connected. Therefore, similarly to the first optical fiber 51 of the first example, the core of the first optical fiber 51 optically connects the core 11 and the core 12, and the core of the second optical fiber 52 optically connects the core 11 and the core 13. The core of the second optical fiber can be understood as a second connection waveguide. The length of the second optical fiber 52 is different from the length of the first optical fiber 51. In the present example, it is assumed that the second optical fiber 52 is longer than the first optical fiber 51.

Here, in the present example, the multicore fiber 10 which is an optical device further includes a third optical waveguide arranged in parallel with the first optical waveguide which is the core 11. In addition, the other end 18 of the first optical waveguide that is the core 11 and the other end 18 of the third optical waveguide that is the core 13 are optically connected via a second connection optical waveguide having a length different from that of the first connection optical waveguide.

A procedure of the crosstalk measuring method of the present example using such a crosstalk measuring device 1 is similar to the flowchart illustrated in FIG. 3. However, the respective steps are different as follows. Differences will be mainly described below.

(Connecting Step S1)

In this step of the present example, the first optical fiber 51 and the second optical fiber 52 are connected to the optical fiber 41 via the coupler 55, and the end of the second optical fiber 52 on the side opposite to the coupler 55 is connected to the optical fiber 43. That is, in the present example, in addition to the connecting step S1 in the first example, the other end 18 of the core 11 and the other end 18 of the core 13 are optically connected via a core of a second optical fiber having a length different from that of the first optical fiber 51. In this way, the core 11 and the core 12 are optically connected, and the core 11 and the core 13 are optically connected.

(First Measuring Step S2)

In this step of the present example, the incident light L is caused to enter the core 11 from the OTDR 20 as in the first example. In the present example, crosstalk occurs as follows in addition to the crosstalk between the core 11 and the core 12 described in the first example, and the crosstalk is measured. This will be described below.

The incident light L incident on the core 11 from the OTDR 20 propagates through the core 11 from the one end 17 to the other end 18, and propagates while causing crosstalk from the core 11 to the core 12, and causing crosstalk from the core 11 to the core 13. The light causing crosstalk from the core 11 to the core 13 is also pulsed, and propagates from the one end 17 side to the other end 18 of the core 13 while traveling substantially in parallel with the incident light L. The power of the crosstalk light CL2 increases according to the distance propagated through the core 13. The crosstalk light CL2 enters the second optical fiber 52 from the optical fiber 43 at substantially the same timing as when the incident light L enters the second optical fiber 52 from the coupler 55. The incident light L and the crosstalk light CL2 pass by each other at substantially a midpoint of the second optical fiber 52. Then, the incident light L enters the core 13 at the other end 18 of the multicore fiber 10 via the fan-in-fan-out device 40, and the crosstalk light CL2 enters the core 11 at substantially the same timing as the timing at which the incident light L enters the core 13. The incident light L incident on the core 13 and the crosstalk light CL2 incident on the core 11 propagate through the respective cores 13 and 11 toward the one end 17 while traveling substantially in parallel. During this time, the incident light L propagating through the core 13 propagates to the core 11 while causing crosstalk. Therefore, the light causing crosstalk from the core 13 to the core 11 is multiplexed with the crosstalk light CL2 propagating through the core 11. The multiplexed light is pulsed and propagates while gradually increasing power. From the one end 17 of the core 11, emitted light in which light such as backscattered light is multiplexed with the pulsed crosstalk light CL2 is emitted. Therefore, the emitted light includes the pulsed crosstalk light CL2. The emitted light emitted from the core 11 enters the OTDR 20 via the fan-in-fan-out device 30 and received by the OTDR 20, and its power is measured by the OTDR 20.

Figure 12:
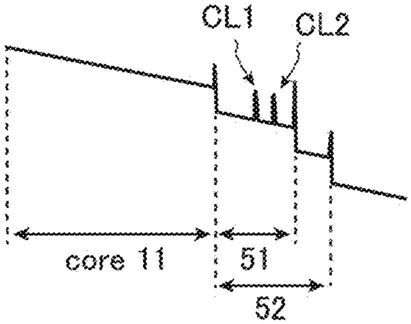
FIG. 12 is a diagram illustrating a measurement result in an OTDR according to a third example.

FIG. 12 is a diagram illustrating a measurement result in the OTDR according to the present example. Since the length of the first optical fiber 51 and the length of the second optical fiber 52 are different from each other, as illustrated in FIG. 12, the emitted light including the crosstalk light CL1 and the emitted light including the crosstalk light CL2 are incident on the OTDR 20 at different timings. In the present example, since the second optical fiber 52 is longer than the first optical fiber 51, the emitted light including the crosstalk light CL2 enters the OTDR at a timing later than that of the emitted light including the crosstalk light CL1. Therefore, the OTDR 20 can measure the emitted light of each of them. Thus, the OTDR 20 measures the power of the emitted light including the pulsed light twice.

Note that the difference between the length of the first optical fiber 51 and the length of the second optical fiber 52 is preferably larger than the half width of the incident light. In this case, the interference between the pulsed light due to the crosstalk between the core 11 and the core 12 and the pulsed light due to the crosstalk between the core 11 and the core 13 can be suppressed, and the magnitude of the crosstalk can be more accurately measured.

(Processing Step S3)

In this step, the processing unit 25 obtains the magnitude of the crosstalk between the core 11 and the core 12 as in the first example using the measured power of the emitted light. Further, in this step of the present example, the processing unit 25 obtains the magnitude of the crosstalk between the core 11 and the core 13. Since the backscattered light is also generated in the first optical fiber 51 and the second optical fiber 52, the power of the backscattered light is measured in a region other than the region where the pulsed light including the crosstalk light CL2 is indicated. Therefore, on the basis of data input from the OTDR 20, the processing unit 25 obtains the power of the backscattered light in the region where the pulsed light including the crosstalk light CL2 is indicated from the power of the emitted light in the region other than the region where the pulsed light including the crosstalk light CL2 is indicated. Specifically, the processing unit 25 obtains the power of the backscattered light in the emitted light including the crosstalk light CL2 in a manner similar to when obtaining the power $P_{BS}$ of the backscattered light in the first example. Next, the processing unit 25 obtains a difference between the power of the emitted light in the region where the pulsed light including the crosstalk light CL2 is indicated and the obtained power of the backscattered light. This difference is the power of the crosstalk light CL2. Also in the present example, when the power $P_{XT\_FIFO}$ of the crosstalk in the fan-in-fan-out devices 30 and 40 is negligibly small, the power may be ignored. However, it is preferable to set the power obtained by removing the power $P_{XT}$ FIFO from the obtained power of the pulsed light as the power of the crosstalk light CL2 from the viewpoint of more accurately obtaining the power P of the crosstalk light CL2.

The processing unit 25 converts the power of the crosstalk light CL1 obtained as in the first example into the magnitude of the crosstalk and outputs the magnitude of the crosstalk, and converts the power of the obtained crosstalk light CL2 into the magnitude of the crosstalk and outputs the magnitude of the crosstalk. At this time, the processing unit 25 may convert the magnitude of the crosstalk light CL2 into decibels indicating the ratio of the power of the incident light L emitted from the one end 17 of the core 13 and output the decibels. In addition, the processing unit 25 may convert the power into decibels indicating the ratio with respect to the predetermined power defined in the OTDR 20 and output the decibels. In this way, the magnitude of the crosstalk between the core 11 and the core 12 as well as the magnitude of the crosstalk between the core 11 and the core 13 are obtained.

In the crosstalk measuring method of the present example, in addition to the crosstalk measuring method of the first example, in the connecting step S1, the other end 18 of the core 11 and the other end 18 of the core 13 are further optically connected via the core of the second optical fiber 52 having a length different from that of the core of the first optical fiber 51, and in the first measuring step S2, power of emitted light emitted from the one end 17 of the core 11 is further measured by the OTDR 20, the emitted light including pulsed light in which light generated by crosstalk of the incident light L from the core 11 to the core 13 and light generated by crosstalk of the incident light L incident on the core 13 from the core 11 via the core of the second optical fiber 52, the crosstalk being from the core 13 to the core 11, are multiplexed, and in the processing step S3, the magnitude of the crosstalk between the core 11 and the core 13 is further obtained by using the power of the emitted light including the pulsed crosstalk light CL2 generated by the crosstalk between the core 11 and the core 13.

Further, in addition to the crosstalk measuring device 1 of the first example, the crosstalk measuring device 1 of the present example further includes the core of the second optical fiber 52 having a length different from that of the core of the first optical fiber 51 that optically connects the other end 18 of the core 11 and the other end 18 of the core 13, the OTDR 20 further measures power of emitted light emitted from the one end 17 of the core 11, the emitted light including pulsed light in which light generated by crosstalk of the incident light L from the core 11 to the core 13 and light generated by crosstalk of the incident light L incident on the core 13 from the core 11 via the core of the second optical fiber 52, the crosstalk being from the core 13 to the core 11, are multiplexed, and the processing unit 25 further obtains the magnitude of the crosstalk between the core 11 and the core 13 by using the power of the emitted light including the pulsed crosstalk light CL2 generated by the crosstalk between the core 11 and the core 13.

By the crosstalk measuring method and the crosstalk measuring device 1 of the present example, the emitted light including the crosstalk light between the core 11 and the core 12 and the emitted light including the crosstalk light between the core 11 and the core 13 can each be received by the OTDR 20, the power of each emitted light can be measured, and the magnitude of each crosstalk can be obtained. Therefore, the magnitude of the crosstalk between the core 11 and the core 12 and the magnitude of the crosstalk between the core 11 and the core 13 can be easily measured as compared with a case where the magnitude of the crosstalk between the core 11 and the core 12 is measured as in the first example, the core 11 and the core 13 are further optically connected thereafter by the connection optical waveguide, the incident light is incident again from the one end 17 of the core 11, and the magnitude of the crosstalk between the core 11 and the core 13 is measured.

Note that, in the present example, it has been described that the second optical fiber 52 is longer than the first optical fiber 51, but the length of the first optical fiber 51 and the length of the second optical fiber 52 only needs to be different, and the first optical fiber 51 may be longer than the second optical fiber 52.

Fourth Example

Next, a fourth example of one or more embodiments will be described in detail with reference to FIG. 13. Note that the same or equivalent components as those in the above embodiments are denoted by the same reference numerals, and redundant description is omitted unless otherwise specified.

Figure 13:
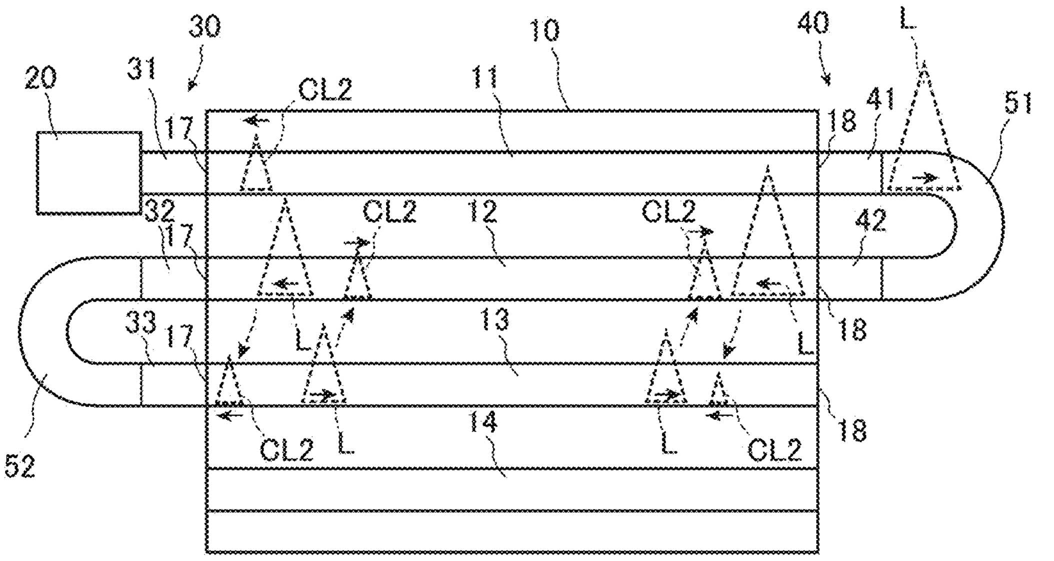
FIG. 13 is a diagram illustrating a crosstalk measuring device according to a fourth example.

FIG. 13 is a diagram illustrating a state of the crosstalk measuring device according to the present example in a manner similar to FIG. 4. A crosstalk measuring device 1 of the present example is different from the crosstalk measuring device 1 of the first example in that the crosstalk measuring device 1 includes a second optical fiber 52, and one end 17 of a core 12 that is a second optical waveguide and one end of a core 13 that is a third optical waveguide are optically connected via a core of the second optical fiber 52 that is a second connection optical waveguide. In the present example, the length of the first optical fiber 51 and the length of the second optical fiber 52 may be different from each other or may be the same.

A procedure of the crosstalk measuring method of the present example using such a crosstalk measuring device 1 is similar to the flowchart illustrated in FIG. 3. However, the respective steps are different as follows. Differences will be mainly described below.

(Connecting Step S1)

In this step of the present example, in addition to the connecting step S1 of the first example, the one end 17 of the core 12 and the one end 17 of the core 13 are optically connected via the core of the second optical fiber 52. Specifically, one end of the second optical fiber 52 is connected to the optical fiber 32 of the fan-in-fan-out device 30, and the other end of the second optical fiber 52 is connected to the optical fiber 33 of the fan-in-fan-out device 30. In this way, the core 12 and the core 13 are optically connected.

(First Measuring Step S2)

In this step of the present example, the incident light L is caused to enter the core 11 from the OTDR 20 as in the first example. In the present example, crosstalk occurs as follows in addition to the crosstalk between the core 11 and the core 12 described in the first example, and the crosstalk is measured. This will be described below.

The incident light L incident on the core 11 from the OTDR 20 propagates through the core 11 from one end 17 to the other end 18, and then enters the core 12 via the first optical fiber 51. The incident light L propagating through the core 12 from the other end 18 to the one end 17 causes crosstalk from the core 12 to the core 11 as described in the first example, and causes crosstalk from the core 12 to the core 13. The light causing crosstalk from the core 12 to the core 13 is also pulsed, and propagates from the other end 18 side of the core 13 to the one end 17 while traveling substantially in parallel with the incident light L. The power of the crosstalk light CL2 increases according to the distance propagated through the core 13. The incident light L enters the core 13 from the core 12 via the second optical fiber 52, and the crosstalk light CL2 enters the core 12 from the core 13 via the second optical fiber 52. The incident light L and the crosstalk light CL2 pass by each other at substantially a midpoint of the second optical fiber 52. Therefore, the timing at which the incident light L enters the core 13 is substantially the same as the timing at which the crosstalk light CL2 enters the core 12. The incident light L incident on the core 13 and the crosstalk light CL2 incident on the core 12 propagate through the respective cores 13 and 12 from one end 17 to the other end 18 while traveling substantially in parallel. During this time, the incident light L propagating through the core 13 propagates to the core 12 while causing crosstalk. Therefore, the light crosstalk from the core 13 to the core 12 multiplexed with the crosstalk light CL2 propagating through the core 12. The multiplexed light is pulsed and propagates while gradually increasing power. The light including the pulsed crosstalk light CL2 enters the core 11 from the core 12 via the first optical fiber 51, and emitted light in which light such as backscattered light is multiplexed with the crosstalk light CL2 is emitted from one end 17 of the core 11. Therefore, the emitted light includes the pulsed crosstalk light CL2. The emitted light emitted from the core 11 enters the OTDR 20 and received by the OTDR 20, and its power is measured by the OTDR 20.

The timing at which the emitted light including the crosstalk light CL2 enters the OTDR 20 is delayed by the time during which the light propagates through the second optical fiber 52, the core 12, the first optical fiber 51, and the core 11 with respect to the timing at which the emitted light including the crosstalk light CL1 enters the OTDR 20. Therefore, the OTDR 20 can measure the emitted light of each of them. Therefore, the OTDR 20 measures the power of the pulsed light twice.

(Processing Step S3)

In this step, the processing unit 25 obtains the magnitude of the crosstalk between the core 11 and the core 12 as in the first example using the measured power of the emitted light. Furthermore, in this step of the present example, the processing unit 25 obtains the magnitude of the crosstalk between the core 12 and the core 13. The method of obtaining the crosstalk between the core 12 and the core 13 is similar to the method of obtaining the crosstalk between the core 11 and the core 13 in the third example.

The processing unit 25 converts the power of the crosstalk light CL1 obtained as in the first example into the magnitude of the crosstalk and outputs the magnitude of the crosstalk, and converts the power of the obtained crosstalk light CL2 into the magnitude of the crosstalk and outputs the magnitude of the crosstalk. At this time, the processing unit 25 may convert the magnitude of the crosstalk into decibels indicating the ratio of the power of the incident light L emitted from the other end 18 of the core 13 and output the decibels. In addition, the processing unit 25 may convert the power into decibels indicating the ratio with respect to the predetermined power defined in the OTDR 20 and output the decibels. In this way, the magnitude of the crosstalk between the core 11 and the core 12 as well as the magnitude of the crosstalk between the core 11 and the core 13 are obtained.

In the crosstalk measuring method of the present example, in addition to the crosstalk measuring method of the first example, in the connecting step S1, one end 17 of the core 12 and one end 17 of the core 13 are further optically connected via the core of the second optical fiber 52, in the first measuring step S2, power of emitted light emitted from the one end 17 of the core 11 is further measured by the OTDR 20 via the first optical fiber 51 and the core 11, the emitted light including pulsed light in which light generated by crosstalk of the incident light L from the core 12 to the core 13 and light generated by crosstalk of the incident light L incident from the core 12 to the core 13 via the core of the second optical fiber 52, the crosstalk being from the core 13 to the core 12, are multiplexed, and in the processing step S3, the magnitude of the crosstalk between the core 12 and the core 13 is further obtained using the power of the emitted light including the pulsed crosstalk light CL2 generated by the crosstalk between the core 12 and the core 13.

Further, in addition to the crosstalk measuring device 1 of the first example, the crosstalk measuring device 1 of the present example further includes the core of the second optical fiber 52 that optically connects the one end 17 of the core 12 and the one end 17 of the core 13, the OTDR 20 further measures power of emitted light emitted from the one end 17 of the core 11 via the first optical fiber 51 and the core 11, the emitted light including pulsed light in which light generated by crosstalk of the incident light L from the core 12 to the core 13 and light generated by crosstalk of the incident light L incident on the core 13 from the core 12 via the core of the second optical fiber 52, the crosstalk being from the core 13 to the core 12, are multiplexed, and the processing unit 25 further obtains the magnitude of the crosstalk between the core 12 and the core 13 by using the power of the emitted light including the pulsed crosstalk light CL2 generated by the crosstalk between the core 12 and the core 13.

By the crosstalk measuring method and the crosstalk measuring device 1 of the present example, the emitted light including the crosstalk light between the core 11 and the core 12 and the emitted light including the crosstalk light between the core 12 and the core 13 can each be received by the OTDR 20, the power of each emitted light can be measured, and the magnitude of each crosstalk can be obtained. Therefore, the magnitude of the crosstalk between the core 11 and the core 12 and the magnitude of the crosstalk between the core 12 and the core 13 can be easily measured as compared with a case where the magnitude of the crosstalk between the core 11 and the core 12 is measured as in the first example, the core 12 and the core 13 are further optically connected thereafter by the connection optical waveguide, the incident light is incident again from the one end 17 of the core 11, and the magnitude of the crosstalk between the core 12 and the core 13 is measured.

In the present example, as illustrated in FIG. 9, a second measuring step S22 may be provided after the first measuring step S2. In this case, in the second measuring step S22, the pulsed incident light L emitted from the OTDR 20 is caused to enter from the other end 18 of the core 13. The OTDR 20 measures power of emitted light emitted from the other end 18 of the core 13, the emitted light including pulsed light in which light generated by crosstalk of the incident light L from the core 13 to the core 12 and light generated by crosstalk of the incident light L incident from the core 13 to the core 12 via the second optical fiber 52, the crosstalk being from the core 12 to the core 13, are multiplexed. Further, the OTDR 20 measures power of emitted light emitted from the other end 18 of the core 13 via the second optical fiber 52 and the core 13 from the one end 17 of the core 12, the emitted light including pulsed light in which light generated by crosstalk from the core 12 to the core 11 while the incident light L propagates through the core 12 from the one end 17 to the other end 18 and light generated by crosstalk of the incident light L incident on the core 11 via the first optical fiber 51, the crosstalk being from the core 11 to the core 12, are multiplexed. In the processing step S3 in this case, as in the second example, the magnitude of the crosstalk between the core 12 and the core 13 is obtained using the power of the emitted light measured in the first measuring step S2 and the power of the emitted light measured in the second measuring step S22.

Fifth Example

Next, a fourth example of one or more embodiments will be described in detail with reference to FIG. 14. Note that the same or equivalent components as those in the above embodiments are denoted by the same reference numerals, and redundant description is omitted unless otherwise specified.

Figure 14:
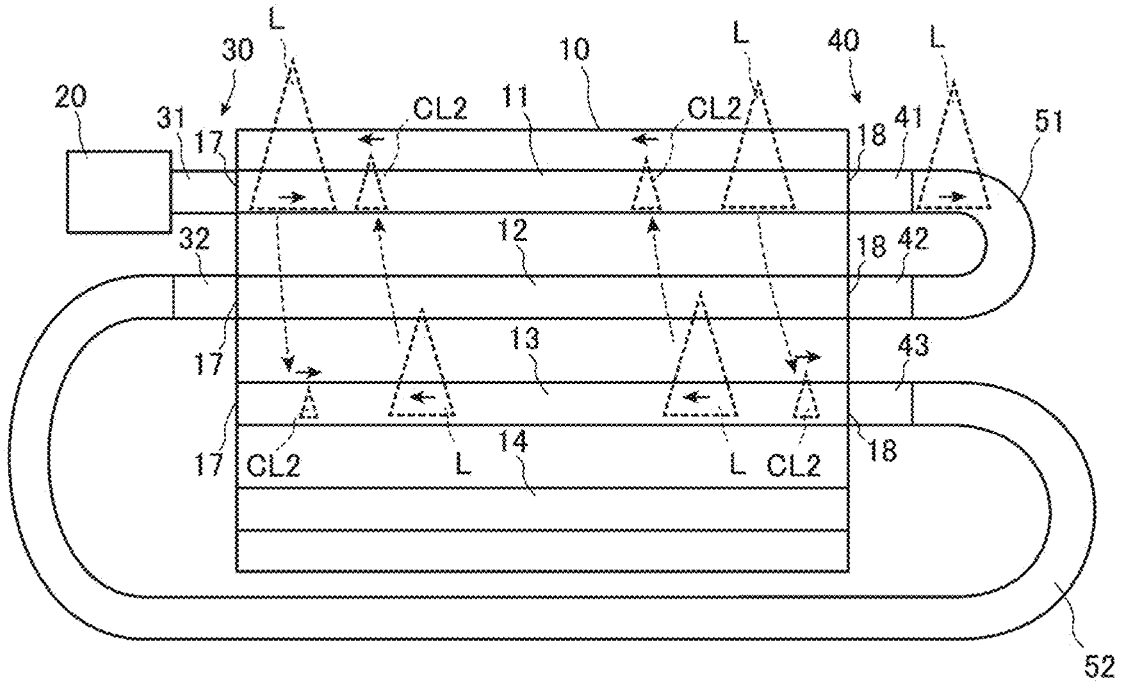
FIG. 14 is a diagram illustrating a crosstalk measuring device according to a fifth example.

FIG. 14 is a diagram illustrating a state of the crosstalk measuring device according to the present example in a manner similar to FIG. 4. A crosstalk measuring device 1 of the present example is different from the crosstalk measuring device 1 of the first example in that it includes a second optical fiber 52 as a second connection waveguide, and one end 17 of a core 12 as a second optical waveguide and the other end of the core 13 as a third optical waveguide are optically connected via the second optical fiber 52. In the present example, the length of the first optical fiber 51 and the length of the second optical fiber 52 may be different from each other or may be the same.

A procedure of the crosstalk measuring method of the present example using such a crosstalk measuring device 1 is similar to the flowchart illustrated in FIG. 3. However, the respective steps are different as follows. Differences will be mainly described below.

(Connecting Step S1)

In this step of the present example, in addition to the connecting step S1 of the first example, the one end 17 of the core 12 and the other end 18 of the core 13 are optically connected via the core of the second optical fiber 52. Specifically, one end of the second optical fiber 52 is connected to the optical fiber 32 of the fan-in-fan-out device 30, and the other end of the second optical fiber 52 is connected to the optical fiber 43 of the fan-in-fan-out device 40. In this way, the core 12 and the core 13 are optically connected.

(First Measuring Step S2)

In this step of the present example, the incident light L is caused to enter the core 11 from the OTDR 20 as in the first example. In the present example, crosstalk occurs as follows in addition to the crosstalk between the core 11 and the core 12 described in the first example, and the crosstalk is measured. This will be described below.

The incident light L incident on the core 11 from the OTDR 20 propagates through the core 11 from the one end 17 to the other end 18, and propagates while causing crosstalk from the core 11 to the core 12, and causing crosstalk from the core 11 to the core 13. The light causing crosstalk from the core 11 to the core 13 is also pulsed, and propagates from the one end 17 side to the other end 18 of the core 13 while traveling substantially in parallel with the incident light L. The power of the crosstalk light CL2 increases according to the distance propagated through the core 13. The incident light L and the crosstalk light CL2 reach the other end 18 at substantially the same timing. The incident light L enters the core 13 from the other end 18 of the core 13 via the first optical fiber 51, the core 12, and the second optical fiber 52 from the other end 18 of the core 11. In addition, the crosstalk light CL2 enters the core 11 from the other end 18 of the core 11 via the second optical fiber 52, the core 12, and the first optical fiber 51 from the other end 18 of the core 13. The incident light L and the crosstalk light CL2 pass by each other at substantially a midpoint of a waveguide in which the core of the first optical fiber 51, the core 12, and the core of the second optical fiber 52 are multiplexed. Therefore, the timing at which the incident light L enters the core 13 is substantially the same as the timing at which the crosstalk light CL2 enters the core 11. The incident light L incident on the core 13 and the crosstalk light CL2 incident on the core 11 propagate through the cores 13 and 11 from the other end 18 toward the one end 17 while traveling substantially in parallel. During this time, the incident light L propagating through the core 13 propagates to the core 11 while causing crosstalk. Therefore, the light causing crosstalk from the core 13 to the core 11 is multiplexed with the crosstalk light CL2 propagating through the core 11. The multiplexed light is pulsed and propagates while gradually increasing power. From the one end 17 of the core 11, emitted light in which light such as backscattered light is multiplexed with the pulsed crosstalk light CL2 is emitted. Therefore, the emitted light includes the pulsed crosstalk light CL2. The emitted light emitted from the core 11 enters the OTDR 20 and received by the OTDR 20, and its power is measured by the OTDR 20.

The timing at which the emitted light including the crosstalk light CL2 enters the OTDR 20 is delayed by the time during which the light propagates through the second optical fiber 52 and the core 13 with respect to the timing at which the emitted light including the crosstalk light CL1 enters the OTDR 20. Therefore, the OTDR 20 can measure the emitted light of each of them. Therefore, the OTDR 20 measures the power of the pulsed light twice.

(Processing Step S3)

In this step, the processing unit 25 obtains the magnitude of the crosstalk between the core 11 and the core 12 as in the first example using the measured power of the emitted light. Further, in this step of the present example, the processing unit 25 obtains the magnitude of the crosstalk between the core 11 and the core 13. The method of obtaining the crosstalk between the core 11 and the core 13 is similar to the method of obtaining the crosstalk between the core 11 and the core 13 in the third example.

The processing unit 25 converts the power of the crosstalk light CL1 obtained as in the first example into the magnitude of the crosstalk and outputs the magnitude of the crosstalk, and converts the power of the obtained crosstalk light CL2 into the magnitude of the crosstalk and outputs the magnitude of the crosstalk. At this time, the processing unit 25 may convert the magnitude of the crosstalk into decibels indicating the ratio of the power of the incident light L emitted from the one end 17 of the core 13 and output the decibels. In addition, the processing unit 25 may convert the power into decibels indicating the ratio with respect to the predetermined power defined in the OTDR 20 and output the decibels. In this way, the magnitude of the crosstalk between the core 11 and the core 12 as well as the magnitude of the crosstalk between the core 11 and the core 13 are obtained.

In the crosstalk measuring method of the present example, in addition to the crosstalk measuring method of the first example, in the connecting step S1, one end 17 of the core 12 and the other end 18 of the core 13 are further optically connected via the core of the second optical fiber 52, in the first measuring step S2, power of emitted light emitted from the one end 17 of the core 11 is further measured by the OTDR 20, the emitted light including pulsed light in which light generated by crosstalk of the incident light L from the core 11 to the core 13 and light generated by crosstalk of the incident light L incident on the core 13 from the core 11 via the core 12 and the core of the second optical fiber 52, the crosstalk being from the core 13 to the core 11, are multiplexed, and in the processing step S3, the magnitude of the crosstalk between the core 11 and the core 13 is further obtained using the power of the emitted light including the pulsed crosstalk light CL2 generated by the crosstalk between the core 11 and the core 13.

Further, in addition to the crosstalk measuring device 1 of the first example, the crosstalk measuring device 1 of the present example further includes the core of the second optical fiber 52 that optically connects the one end 17 of the core 12 and the other end 18 of the core 13, the OTDR 20 further measures power of emitted light emitted from the one end 17 of the core 11, the emitted light including pulsed light in which light generated by crosstalk of the incident light L from the core 11 to the core 13 and light generated by crosstalk of the incident light L incident on the core 13 from the core 11 via the core 12 and the core of the second optical fiber 52, the crosstalk being from the core 13 to the core 11, are multiplexed, and the processing unit 25 further obtains the magnitude of the crosstalk between the core 11 and the core 13 by using the power of the emitted light including the pulsed crosstalk light CL2 generated by the crosstalk between the core 11 and the core 13.

By the crosstalk measuring method and the crosstalk measuring device 1 of the present example, the emitted light including the crosstalk light between the core 11 and the core 12 and the emitted light including the crosstalk light between the core 11 and the core 13 can each be received by the OTDR 20, the power of each emitted light can be measured, and the magnitude of each crosstalk can be obtained. Therefore, the magnitude of the crosstalk between the core 11 and the core 12 and the magnitude of the crosstalk between the core 11 and the core 13 can be easily measured as compared with a case where the magnitude of the crosstalk between the core 11 and the core 12 is measured as in the first example, the core 11 and the core 13 are further optically connected thereafter by the connection optical waveguide, the incident light is incident again from the one end 17 of the core 11, and the magnitude of the crosstalk between the core 11 and the core 13 is measured.

In the present example, as illustrated in FIG. 9, a second measuring step S22 may be provided after the first measuring step S2. In this case, in the second measuring step S22, the pulsed incident light L emitted from the OTDR 20 is caused to enter from the one end 17 of the core 13. The OTDR 20 measures power of emitted light emitted from the one end 17 of the core 13, the emitted light including pulsed light in which light generated by crosstalk of the incident light L from the core 13 to the core 11 and light generated by crosstalk of the incident light L incident from the core 13 to the core 11 via the second optical fiber 52, the core 12, and the first optical fiber 51, the crosstalk being from the core 11 to the core 13, are multiplexed. Further, the OTDR 20 measures power of emitted light emitted from the one end 17 of the core 13 via the second optical fiber 52 and the core 13 from the one end 17 of the core 12, the emitted light including pulsed light in which light generated by crosstalk from the core 12 to the core 11 while the incident light L propagates through the core 12 from the one end 17 to the other end 18 and light generated by crosstalk of the incident light L incident on the core 11 via the first optical fiber 51, the crosstalk being from the core 11 to the core 12, are multiplexed. In the processing step S3 in this case, similarly to the second example, the magnitude of the crosstalk between the core 11 and the core 13 is obtained using the power of the emitted light measured in the first measuring step S2 and the power of the emitted light measured in the second measuring step S22.

Although the present invention has been described by taking the above-described embodiments as an example, the present invention is not limited thereto.

For example, the arrangement and number of cores of the multicore fiber 10 may be different from those in the above embodiments.

In the above embodiments, the multicore fiber has been described as an example of the optical device in which the waveguides are arranged in parallel, but the optical device of the present invention is not limited to the multi-core fiber. For example, it is applicable to an optical fiber cable in which a plurality of optical fibers is arranged, an optical fiber tape in which a plurality of optical fibers is arranged in a planar manner, a multi-element fiber in which a plurality of optical fiber bare wires is arranged in one coating layer, and crosstalk measurement of the entire transmission system.

In at least one of the first measuring step S2 or the second measuring step S22 of the above embodiments, at least one of a loss of light, a reflection intensity, a bending loss, or a disconnection in an optical device such as the multicore fiber 10 may be further measured by the OTDR 20.

In addition, the forms of the fan-in-fan-out devices 30 and 40 are not particularly limited. Further, the crosstalk measuring device 1 need not include at least one of the fan-in-fan-out devices 30 and 40. In this case, for example, the core of the multicore fiber 10 is directly connected to the core of the first optical fiber 51 or the core of the second optical fiber 52. In addition, at least one of the first optical fiber 51 and the second optical fiber 52 may include a connecting body of a plurality of optical fibers.

Figure 15:
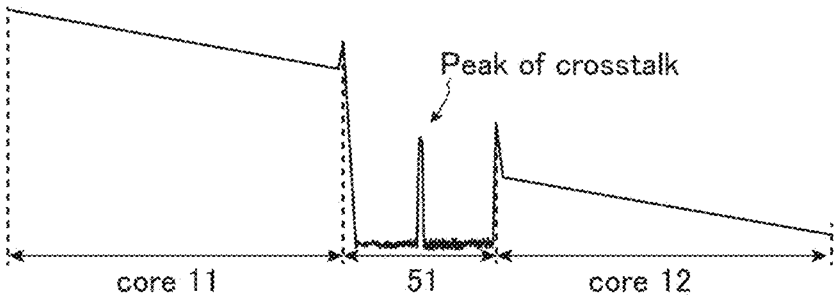
FIG. 15 is a diagram illustrating a measurement result in an OTDR in a case where a hollow core optical fiber is used as a first optical fiber in FIG. 4.

In the above embodiments, for example, as illustrated in FIG. 5, the inclination of the power of the backscattered light measured by the OTDR 20 is substantially the same in the sections of the core 11, the core 12, the first optical fiber 51, and the like. This indicates that the loss of the incident light L per unit length due to backscattering is substantially the same in the sections of the core 11, the core 12, the first optical fiber 51, and the like. Therefore, in the above embodiments, when light of the same power is propagated to the core 11, the core 12, the first optical fiber 51, and the like, the power of the backscattered light per unit length generated in each section is substantially the same. However, when light having the same power is propagated to the core 11, the core 12, the first optical fiber 51, and the like, the power of the backscattered light per unit length generated in the first optical fiber 51 is preferably smaller than the power of the backscattered light per unit length generated in each of the core 11 and the core 12. As such a first optical fiber 51, for example, a hollow core optical fiber having a hollow core can be exemplified. Alternatively, such a first optical fiber 51 may be an optical fiber in which the relative refractive index difference of the core of the first optical fiber 51 is smaller than that of light propagated through the core of the multicore fiber 10 and the effective cross-sectional area of the propagated light is larger. This is because the power of the backscattered light is proportional to a numerical aperture (NA) corresponding to the relative refractive index difference. FIG. 15 is a schematic diagram illustrating a measurement result in the OTDR 20 in a case where a hollow core optical fiber is used as the first optical fiber 51 in FIG. 4. Here, FIG. 15 is a schematic diagram of a measurement result in the case of using a multicore fiber having two cores. As illustrated in FIG. 15, it can be seen that almost no backscattered light is generated in the first optical fiber 51. Therefore, the ratio of the power of the crosstalk light to the power of the backscattered light is increased, and the crosstalk light can be easily detected. For the same reason as described above, the power of the backscattered light per unit length generated in the second optical fiber 52 of the third to fifth examples is preferably smaller than the power of the backscattered light per unit length generated in each of the cores 11 to 13.

Figure 16:
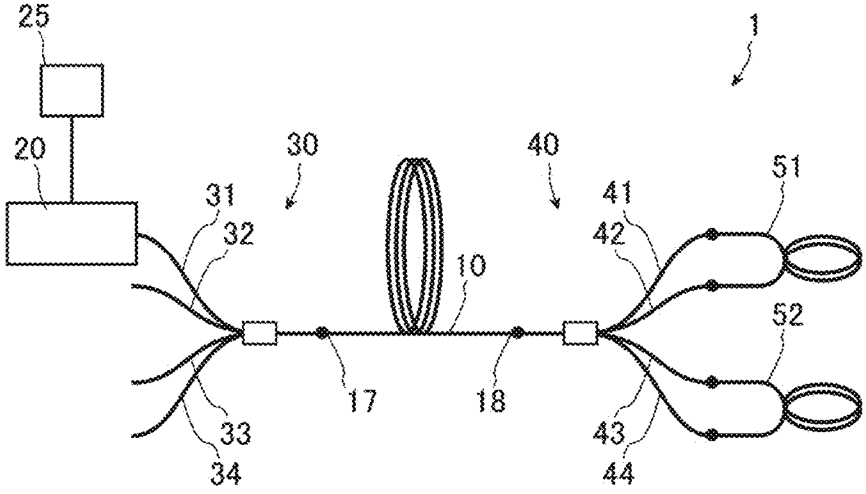
FIG. 16 is a diagram illustrating a modification of the crosstalk measuring device of the first example.

In addition, in the first example, as illustrated in FIGS. 2 and 4, an example in which the core 13 and the core 14 are not connected to each other by an optical fiber has been described. However, the present invention is not limited thereto. FIG. 16 is a diagram illustrating a modification of the crosstalk measuring device of the first example. As illustrated in FIG. 16, the present modification is different from the first example in that the optical fibers 43 and 44 of the fan-in-fan-out device 40 are connected to the second optical fiber 52, and the other end 18 of the core 13 and the other end 18 of the core 14 are optically connected via the core of the second optical fiber 52. The length of the second optical fiber 52 is the same as the length of the first optical fiber 51. Therefore, the distance in which light propagates from the other end 18 of the core 13 to the other end 18 of the core 14 is the same as the distance in which light propagates from the other end 18 of the core 11 to the other end 18 of the core 12. In the first example, the pulsed light in which the crosstalk light CL1 in which the incident light causes crosstalk from the core 11 to the core 12 and the crosstalk light CL1 in which the incident light causes crosstalk from the core 12 to the core 11 are multiplexed is measured. However, the crosstalk light CL1 causing crosstalk from the core 11 to the core 12 also includes light in which light causing crosstalk from the core 11 to the cores 13 and 14 further causes crosstalk to the core 12. Similarly, the light causing crosstalk from the core 12 to the core 11 also includes light in which light causing crosstalk from the core 12 to the cores 13 and 14 further causes crosstalk to the core 11. In the first example, since there is no optical connection between the core 13 and the core 14, out of light that has caused crosstalk from the core 11 to the cores 13 and 14, light that does not further cause crosstalk to the core 12 is emitted from the other end 18. However, according to the present modification, out of the light that has caused crosstalk from the core 11 to the core 13, light that does not further cause crosstalk to the core 12 enters the core 14 via the second optical fiber 52, and out of the light that has caused crosstalk from the core 11 to the core 14, light that does not further cause crosstalk to the core 12 enters the core 13 via the second optical fiber 52. When light incident on the cores 13 and 14 via the second optical fiber 52 propagates through the cores 13 and 14 from the other end 18 side to the one end 17 side, crosstalk of the core 12 further occurs. In addition, as described above, since the distance in which light propagates from the other end 18 of the core 13 to the other end 18 of the core 14 is the same as the distance in which light propagates from the other end 18 of the core 11 to the other end 18 of the core 12, the timing at which the crosstalk light CL1 emitted from the other end of the core 12 enters the other end of the core 11 is substantially the same as the timing at which light that does not further cause crosstalk to the core 12 out of light that has caused crosstalk from the core 11 to the cores 13 and 14 enters the cores 14 and 13 via the second optical fiber 52. With such a configuration, light that causes crosstalk to the core 12 via the cores 13 and 14 is reflected on the crosstalk light CL1 in both the outward path and the return path. Therefore, in the present modification, by optically connecting the other ends 18 of the core 13 that is the third waveguide and the core 14 that is the fourth waveguide, which cause crosstalk with the core 11 that is the first optical waveguide and the core 12 as the second optical waveguide, respectively, via the core of the second optical fiber 52 that is the second connection optical waveguide, the magnitude of crosstalk can be even more accurately measured than the first example.

As described above, according to one or more embodiments, a crosstalk measuring method and a crosstalk measuring device capable of easily measuring crosstalk using an OTDR method are provided, and are expected to be used in the field of optical fiber communication and the like. Although the disclosure has been described with r respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A crosstalk measuring method for an optical device including a first optical waveguide and a second optical waveguide parallel to the first optical waveguide, the crosstalk measuring method comprising:

optically connecting one end of the first optical waveguide to one end of the second optical waveguide via a first connection optical waveguide;

inputting pulsed incident light emitted from an optical time domain reflectometer (OTDR) into the other end of the first optical waveguide;

outputting, from the other end of the first optical waveguide, first output light including pulsed light in which first crosstalk light is multiplexed with second crosstalk light, wherein the first crosstalk light is generated by crosstalk of the pulsed incident light from the first optical waveguide to the second optical waveguide when the pulsed incident light enters the first optical waveguide from the ODTR, and the second crosstalk light is generated by crosstalk of the pulsed incident light from the second optical waveguide to the first optical waveguide when the pulsed incident light enters the second optical waveguide from the first optical waveguide via the first connection optical waveguide;

measuring power of the first output light; and calculating a magnitude of crosstalk between the first optical waveguide and the second optical waveguide based on the measured power of the first output light.

2. The crosstalk measuring method according to claim 1, wherein a length of the first connection optical waveguide is longer than a half width of the pulsed incident light.

3. The crosstalk measuring method according to claim 1, further comprising:

inputting the pulsed incident light emitted from the OTDR into the other end of the second optical waveguide;

outputting, from the other end of the second optical waveguide, second output light including pulsed light in which third crosstalk light is multiplexed with fourth crosstalk light, wherein the third crosstalk light is generated by crosstalk of the pulsed incident light from the second optical waveguide to the first optical waveguide when the pulsed incident light enters the second optical waveguide from the ODTR, and the fourth crosstalk light is generated by crosstalk of the pulsed incident light from the first optical waveguide to the second optical waveguide when the pulsed incident light enters the first optical waveguide from the second optical waveguide via the first connection optical waveguide;

measuring power of the second output light; and calculating the magnitude of the crosstalk based on both the measured power of the first output light and the measured power of the second output light.

4. The crosstalk measuring method according to claim 3, wherein the magnitude of the crosstalk is calculated based on a result of averaging the measured power of the first output light and the measured power of the second output light.

5. The crosstalk measuring method according to claim 1, wherein a wavelength width of the pulsed incident light is equal to or greater than 1 nm.

6. The crosstalk measuring method according to claim 1, further comprising:

optically connecting, by a fan-in-fan-out device, the OTDR to the first optical waveguide, the first optical waveguide to the first connection optical waveguide, and the first connection optical waveguide to the second optical waveguide, wherein the calculating of the magnitude of the crosstalk comprises removing a magnitude of crosstalk in the fan-in-fan-out device.

7. The crosstalk measuring method according to claim 1, wherein the optical device further includes a third optical waveguide parallel to the first optical waveguide, and the crosstalk measuring method further comprises:

calculating a magnitude of crosstalk between the first optical waveguide and the third optical waveguide based on the calculated magnitude of the crosstalk between the first optical waveguide and the second optical waveguide.

8. The crosstalk measuring method according to claim 1, wherein the optical device further includes a third optical waveguide parallel to the first optical waveguide, and the crosstalk measuring method further comprises:

optically connecting the one end of the first optical waveguide to an end of the third optical waveguide via a second connection optical waveguide having a length different from a length of the first connection optical waveguide;

outputting, from the other end of the first optical waveguide, the second output light including pulsed light in which third crosstalk light is multiplexed with fourth crosstalk light, wherein the third crosstalk light is generated by crosstalk of the pulsed incident light from the first optical waveguide to the third optical waveguide, and the fourth crosstalk light is generated by crosstalk of the pulsed incident light from the third optical waveguide to the first optical waveguide when the pulsed incident light enters the third optical waveguide from the first optical waveguide to via the second connection optical waveguide;

measuring power of the second output light; and calculating a magnitude of crosstalk between the first optical waveguide and the third optical waveguide based on the measured power of the second output light.

9. The crosstalk measuring method according to claim 1, wherein the optical device further includes a third optical waveguide parallel to the second optical waveguide, and the crosstalk measuring method further comprises:

optically connecting the other end of the second optical waveguide to an end of the third optical waveguide via a second connection optical waveguide;

outputting, from the other end of the first optical waveguide via the first connection optical waveguide and the first optical waveguide, second output light including pulsed light in which third crosstalk light is multiplexed with fourth crosstalk light, wherein the third crosstalk light is generated by crosstalk of the pulsed incident light from the second optical waveguide to the third optical waveguide when the pulsed incident light enters the second optical waveguide from the first optical waveguide to via the first connection optical waveguide, and the fourth crosstalk light is generated by crosstalk of the pulsed incident light from the third optical waveguide to the second optical waveguide when the pulsed incident light enters the third optical waveguide from the second optical waveguide via the second connection optical waveguide;

measuring power of the second output light; and calculating a magnitude of crosstalk between the second optical waveguide and the third optical waveguide based on the measured power of the second output light.

10. The crosstalk measuring method according to claim 1, wherein the optical device further includes a third optical waveguide parallel to the first optical waveguide, and the crosstalk measuring method further comprises:

optically connecting the other end of the second optical waveguide to an end of the third optical waveguide via a second connection optical waveguide;

outputting, from the other end of the first optical waveguide, second output light including pulsed light in which third crosstalk light is multiplexed with fourth crosstalk light, wherein the third crosstalk is generated by crosstalk of the pulsed incident light from the first optical waveguide to the third optical waveguide when the pulsed incident light enters the first optical waveguide from the OTDR, and the fourth crosstalk light is generated by crosstalk of the pulsed incident light from the third optical waveguide to the first optical waveguide when the pulsed incident light enters the third optical waveguide from the first optical waveguide via the first connection optical waveguide, the second optical waveguide, and the second connection optical waveguide;

measuring power of the second output light; and calculating a magnitude of crosstalk between the first optical waveguide and the third optical waveguide based on the measured power of the second output light.

11. The crosstalk measuring method according to claim 1, wherein the measuring of the power of the first output light includes measuring one or more of a loss of light, a reflection intensity, a bending loss, and a disconnection in the optical device.

12. The crosstalk measuring method according to claim 1, wherein when light having power propagates through the first optical waveguide, the second optical waveguide, and the first connection optical waveguide, power of backscattered light per unit length generated in the first connection optical waveguide is smaller than power of backscattered light per unit length generated in each of the first optical waveguide and the second optical waveguide.

13. A crosstalk measuring device for an optical device including a first optical waveguide and a second optical waveguide parallel to the first optical waveguide, the crosstalk measuring device comprising:

a connection optical waveguide that optically connects one end of the first optical waveguide to one end of the second optical waveguide;

an optical time domain reflectometer (OTDR) that:

causes pulsed incident light to enter the other end of the first optical waveguide, and measures power of output light, including pulsed light in which first crosstalk light is multiplexed with second crosstalk light, from the other end of the first optical waveguide, wherein the first crosstalk light is generated by crosstalk of the pulsed incident light from the first optical waveguide to the second optical waveguide when the pulsed incident light enters the first optical waveguide, and the second crosstalk light is generated by crosstalk of the pulsed incident light from the second optical waveguide to the first optical waveguide when the pulsed incident light enters the second optical waveguide from the first optical waveguide via the connection optical waveguide; and a processor that calculates a magnitude of crosstalk between the first optical waveguide and the second optical waveguide based on the measured power of the output light.

* * * * *